(12) United States Patent
Brown et al.

(10) Patent No.: US 12,471,972 B2
(45) Date of Patent: Nov. 18, 2025

(54) SYSTEMS FOR TREATING AND/OR PREVENTING FRACTURES AND RELATED DEVICES AND METHODS

(71) Applicant: Wake Forest University Health Sciences, Winston-Salem, NC (US)

(72) Inventors: Philip Jayson Brown, Winston Salem, NC (US); Brandon Lee Roller, Eugene, OR (US)

(73) Assignee: Wake Forest University Health Sciences, Winston-Salem, NC (US)

( * ) Notice: Subject to any disclaimer, the term of this patent is extended or adjusted under 35 U.S.C. 154(b) by 814 days.

(21) Appl. No.: 17/636,454

(22) PCT Filed: Aug. 27, 2020

(86) PCT No.: PCT/US2020/048201
§ 371 (c)(1),
(2) Date: Feb. 18, 2022

(87) PCT Pub. No.: WO2021/041677
PCT Pub. Date: Mar. 4, 2021

(65) Prior Publication Data
US 2022/0287749 A1   Sep. 15, 2022

Related U.S. Application Data

(60) Provisional application No. 62/892,882, filed on Aug. 28, 2019.

(51) Int. Cl.
*A61B 17/84* (2006.01)
*A61B 17/56* (2006.01)
(Continued)

(52) U.S. Cl.
CPC ........ *A61B 17/846* (2013.01); *A61B 17/8805* (2013.01); *A61B 17/8872* (2013.01);
(Continued)

(58) Field of Classification Search
CPC ............ A61B 17/8802; A61B 17/8805; A61B 17/8811; A61B 17/8816; A61B 17/8819;
(Continued)

(56) References Cited

U.S. PATENT DOCUMENTS

| 6,679,890 B2 | 1/2004 | Margulies et al. |
| 2003/0045885 A1* | 3/2003 | Margulies .......... A61B 17/7098 606/94 |

(Continued)

FOREIGN PATENT DOCUMENTS

WO   2010059860 A1   5/2010

OTHER PUBLICATIONS

International Search Report and the Written Opinion of the International Searching Authority corresponding to International Patent Application No. PCT/US2020/048201 (9 pages) (mailed Dec. 11, 2020).

*Primary Examiner* — Marcela I. Shirsat
(74) *Attorney, Agent, or Firm* — Myers Bigel, P.A.

(57) ABSTRACT

Systems for treating and/or preventing fractures include at least one needle sized and configured to be placed into target bone and at least one implantable pin configured to be releasably held in a first needle of the at least one needle. The systems also include at least one delivery device of injectable material configured to couple to the first needle while the first implantable pin is held in the first needle whereby the at least one delivery device and a respective needle cooperate to serially provide an external column of the injectable material about the at least one implantable pin.

37 Claims, 38 Drawing Sheets

(51) Int. Cl.
*A61B 17/68* (2006.01)
*A61B 17/72* (2006.01)
*A61B 17/74* (2006.01)
*A61B 17/86* (2006.01)
*A61B 17/88* (2006.01)
*A61F 2/28* (2006.01)

(52) U.S. Cl.
CPC ......... *A61B 2017/564* (2013.01); *A61B 17/68* (2013.01); *A61B 17/7225* (2013.01); *A61B 17/7258* (2013.01); *A61B 17/7283* (2013.01); *A61B 17/742* (2013.01); *A61B 17/86* (2013.01); *A61F 2/28* (2013.01); *A61F 2002/2825* (2013.01); *A61F 2002/2828* (2013.01); *A61F 2002/2832* (2013.01)

(58) Field of Classification Search
CPC ............ A61B 17/8825; A61B 17/8833; A61B 17/8841; A61B 17/68; A61B 17/7241; A61B 17/86; A61B 17/7225; A61B 17/7258; A61B 17/846; A61B 17/742; A61B 17/7283; A61B 17/74; A61B 17/8872; A61B 17/7266; A61F 2/28; A61F 2002/2825; A61F 2002/2828; A61F 2002/2832
USPC ..... 606/60, 62–68, 98, 86 R, 301, 304, 305, 606/309, 314, 319, 320, 328
See application file for complete search history.

(56) References Cited

U.S. PATENT DOCUMENTS

| | | | |
|---|---|---|---|
| 2006/0089642 A1* | 4/2006 | Diaz | A61B 17/72 623/23.49 |
| 2007/0173834 A1 | 7/2007 | Thakkar | |
| 2009/0048672 A1 | 2/2009 | Essenmacher | |
| 2009/0204158 A1* | 8/2009 | Sweeney | A61B 17/8685 604/264 |
| 2011/0218585 A1* | 9/2011 | Krinke | A61B 17/68 606/86 R |
| 2012/0277804 A1 | 11/2012 | Bhatnagar et al. | |
| 2017/0258503 A1* | 9/2017 | Aebi | A61B 17/864 |

* cited by examiner

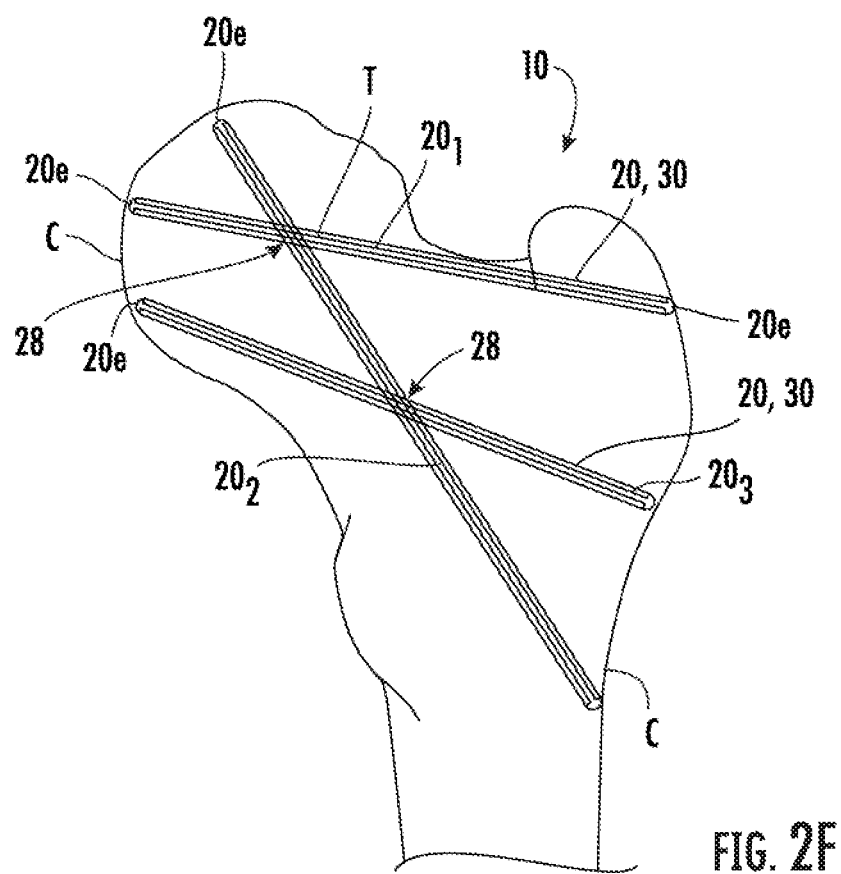

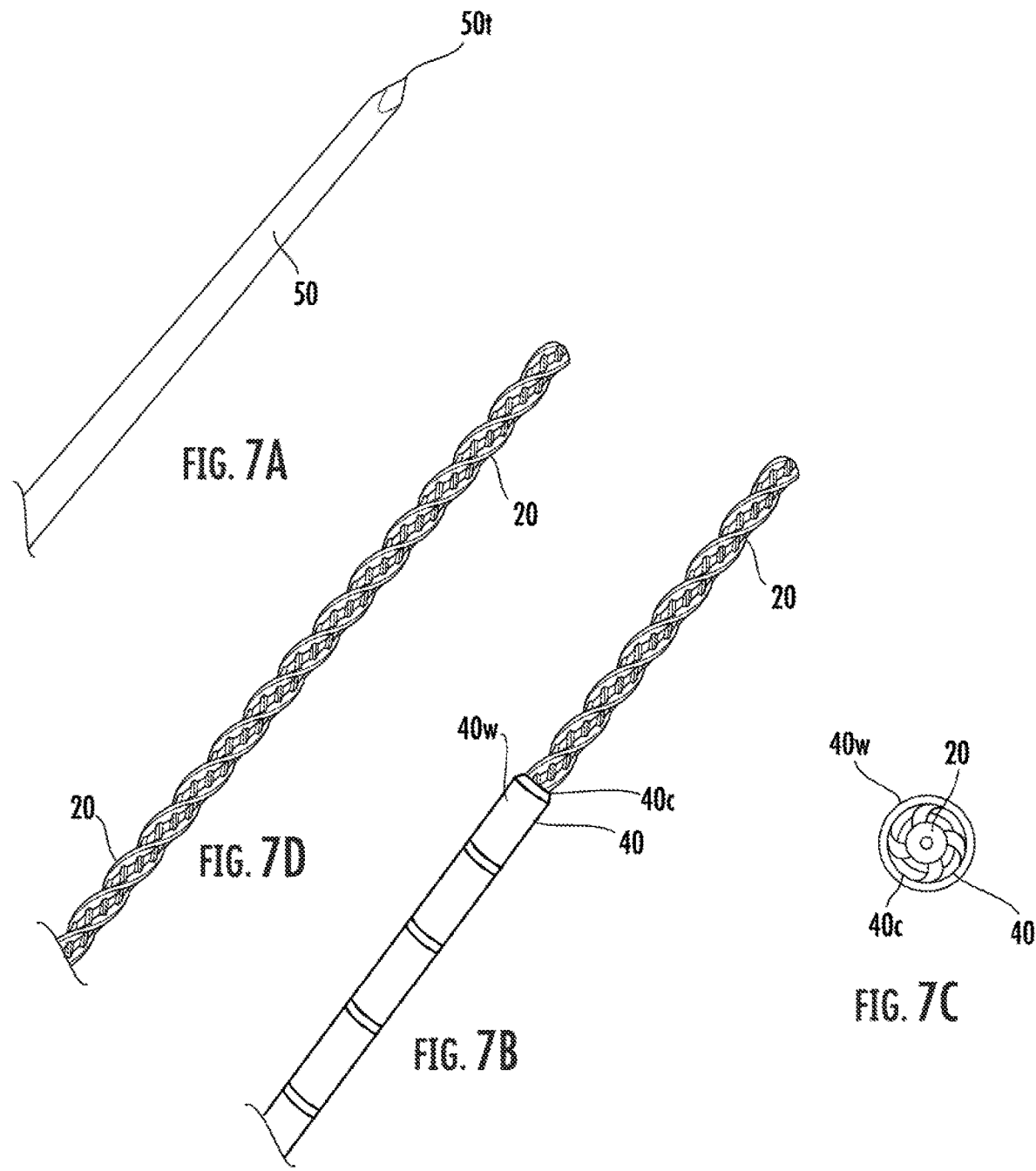

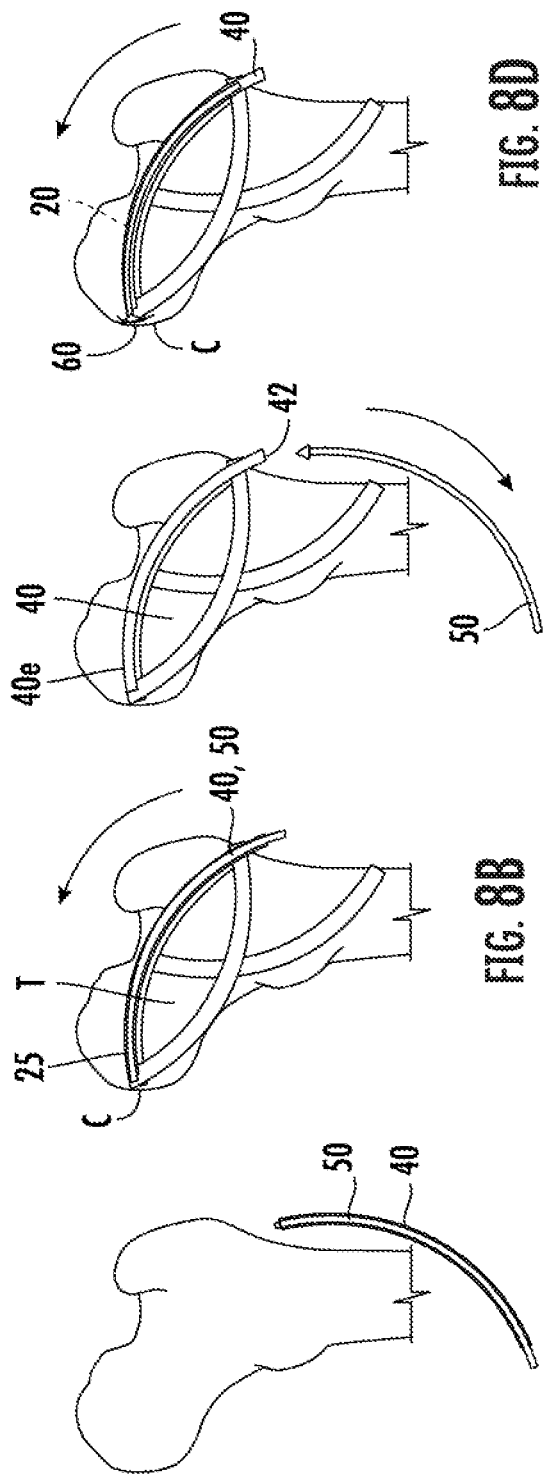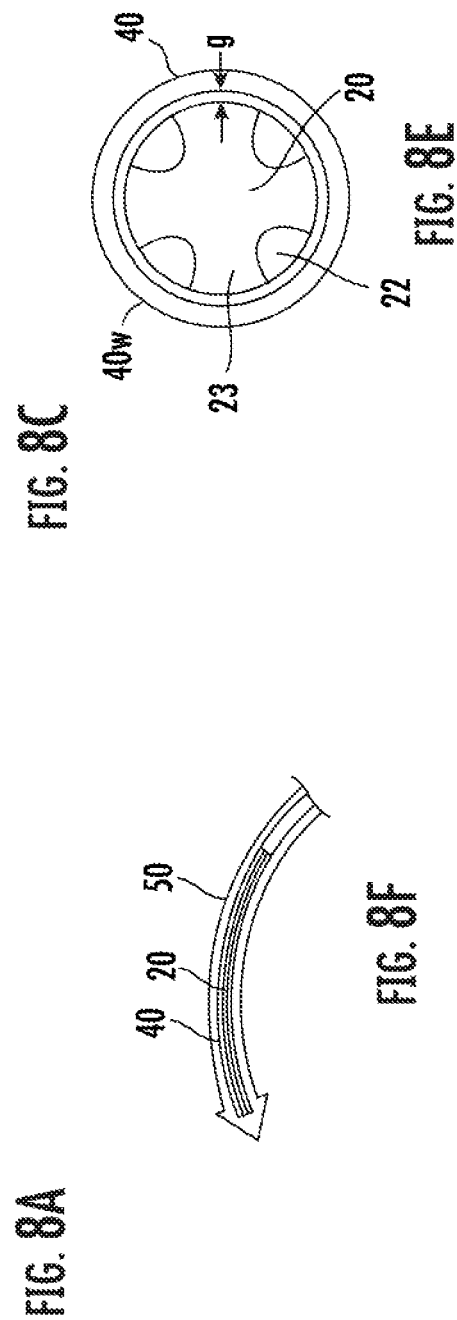

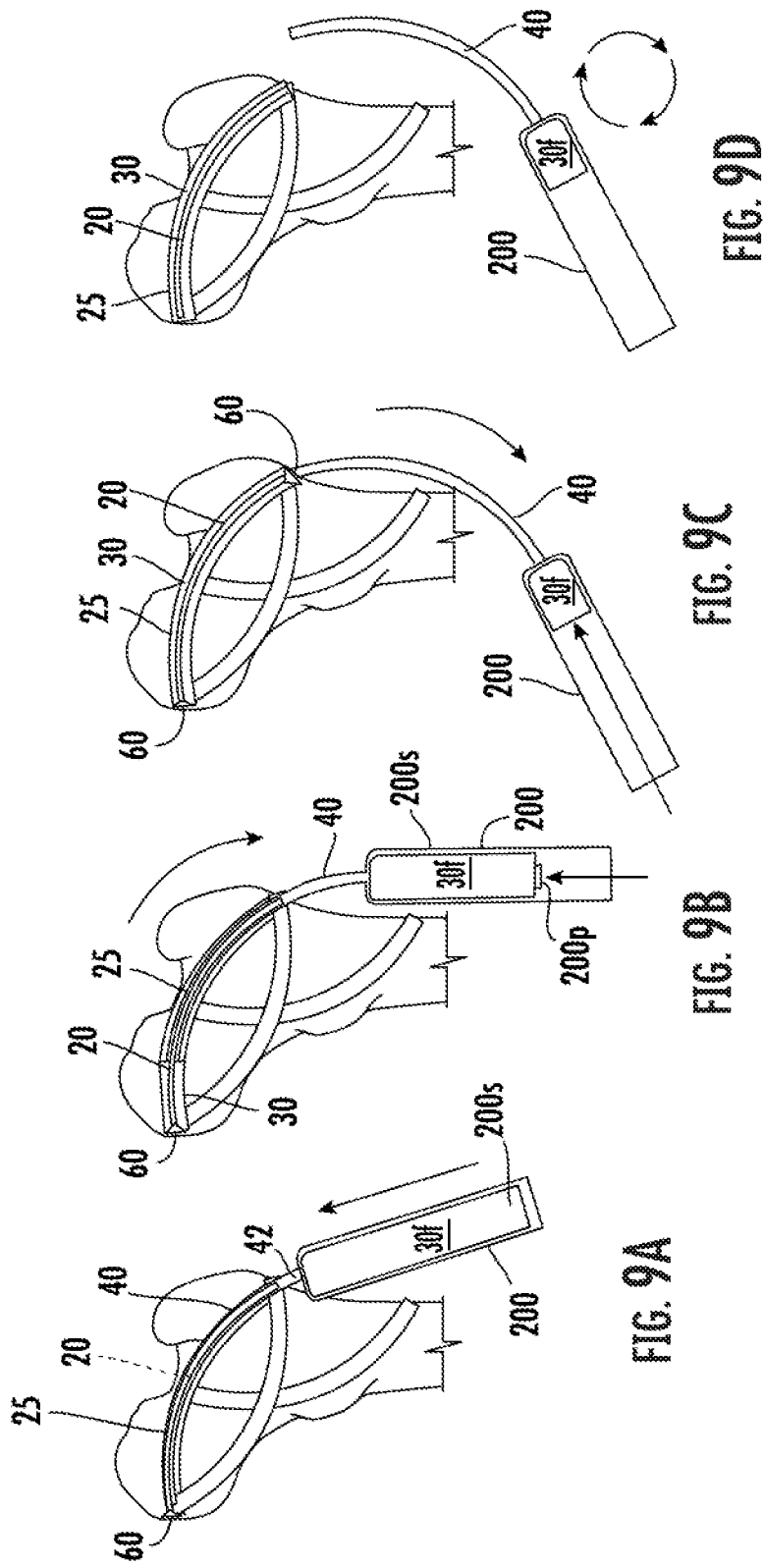

SYSTEMS FOR TREATING AND/OR PREVENTING FRACTURES AND RELATED DEVICES AND METHODS

RELATED APPLICATIONS

This patent application is a 35 U.S.C. § 371 national phase application of PCT Application Number PCT/US2020/048201, filed Aug. 27, 2020, which claims priority to and the benefit of U.S. Provisional Patent Application Ser. No. 62/892,882, filed Aug. 28, 2019, the contents of each of which are hereby incorporated by reference as if recited in full herein.

FIELD OF THE INVENTION

The present invention relates to medical implants and related implant systems that may be particularly suitable for treating fractures and/or for providing prophylactic osteoporotic fracture prevention treatments.

BACKGROUND

The structural integrity of skeletal bone in human and/or animal patients can degrade due to injury, disease and/or age. For example, the proximal end of the femur is a load bearing component of the hip joint and includes a head, neck, greater trochanter and lesser trochanter. Hip fractures can result in a significant loss of function and/or decline in patient health or mobility. Further, osteoporotic-related hip fractures can have high cost and increased morbidity rates relative to other fractures.

Injectable bone filler materials have been proposed as treatments that can bolster bone density and/or otherwise increase fracture resistance of the osteoporotic proximal femur. Also, a hybrid technique using a relatively large hollow implant and bone cement has been proposed. See, e.g., U.S. Pat. No. 6,679,890. However, it is believed that these types of treatments have had inconsistent results and/or little clinical adoption.

There is a need for minimally invasive treatments that can treat bone fractures or that can structurally augment bones that are susceptible to fractures such as osteoporotic-associated fractures.

SUMMARY OF EMBODIMENTS OF THE INVENTION

Embodiments of the invention are directed to systems, devices and methods for improving existing and/or restoring damaged structural integrity of skeletal bone in human and/or animal patients which can degrade over time due to injury, disease and/or age.

Some particular embodiments are directed to devices, systems and methods for the treatment of hip fractures or for preventative treatment of the hip, particularly for patients at risk of osteoporotic-associated proximal femur fractures.

Some embodiments are directed to devices, systems and methods for treating non-displaced and/or hairline fractures of skeletal bones.

Some embodiments are directed to surgical systems that can be used for minimally invasive surgeries to place one or more rigid or semi-rigid pins in bone, followed by inserting flowable bone filler about the pin(s) in a flowable state that then solidifies between the pin(s) and adjacent bone. The bone filler, once solidified, e.g., set or cured, couples to the pin(s) and forms respective solid bodies about the pins in cancellous bone of a femur or other trabecular bone.

Embodiments of the invention can serially provide site-specific columns of bone filler at a plurality of elongate sites about respective implantable pins.

Embodiments of the invention are directed to medical implant systems for structurally augmenting bone or treating a fracture. The systems include: at least one needle sized and configured to be placed into target bone; at least one implantable pin, a first implantable pin of the at least one implantable pin configured to be releasably held in a first needle of the at least one needle; and at least one delivery device of injectable material configured to couple to the first needle while the first implantable pin is held in the first needle whereby the at least one delivery device and the first needle cooperate to provide an external column of the injectable material about the first implantable pin.

The at least one implantable pin can have one or more of: (a) a solid body with a maximal cross-sectional area in a range of 1-5 mm; (b) a maximal outer diameter of 5 mm; (c) at least one spirally extending rib on an outer surface thereof; (d) an open longitudinally extending channel in fluid communication with a plurality of spaced apart fluid ports positioned in a spiral pattern along a length of the implantable pins; (e) have a body with an outer diameter that is in a range of about a 7 gauge-9 gauge size; or (f) a curved body with a radius of curvature extending over a length dimension.

The system can further include a stylet sized and configured to slidably and releasably couple to the at least one needle. The stylet can have rigidity sufficient to form a bone channel in cancellous bone to thereby place the at least one needle into the target bone directly using the stylet without reaming a bone channel with a drill.

The injectable material can be configured to solidify in vivo to define a solid external column of material that is coupled to and extends over at least a major portion of a length of the first implantable pin.

The first needle can be curvilinear. When implanted in a patient, the first implantable pin can have a radius of curvature over a length dimension that defines a curved elongate body.

The system can further include a second implantable pin configured to serially releasably couple to the first needle of the at least one needle in place of the first implantable pin or couple to a second needle of the at least one needle.

In position, the first implantable pin can curve outward in a direction toward a proximal end of a femur and has opposing first and second end portions. The second implantable pin can curve outward in a direction opposite the first implantable pin and has opposing first and second end portions.

When implanted, the first end portion of the first implantable pin can be coupled to the first end portion of the second implantable pin. The second end portion of the first implantable pin can be coupled to the second end portion of the second implantable pin whereby the first and second implantable pins are interlocked to provide load bearing beams to form an internal truss within the target bone.

The system can further include a second implantable pin configured to serially releasably couple to the first needle of the at least one needle in place of the first implantable pin or couple to a second needle of the at least one needle. When implanted, the first and second implantable pins can be configured to laterally extend over an entire lateral extent or substantially the entire lateral extent of a proximal end portion of a femur between a femoral head and greater trochanter to thereby define columns of load bearing beams that form an internal truss within the proximal end portion of the femur.

The system can further include a third implantable pin. The third implantable pin can be configured to extend in a different plane and across a medial segment of one or both of the first and second implantable pins from a location under a lesser trochanter to a location proximate the proximal end of the femur between a femoral head and greater trochanter.

The needle can be cylindrical with an open longitudinally extending channel and a wall surrounding the open channel.

Optionally the needle can include at least one fluid delivery port extending through the outer wall of the needle.

The at least one implantable pin can be configured to have a straight linear shape outside the needle when not exposed to compressive forces and can be configured to have a curvilinear shape when exposed to compressive forces when in the first needle and/or when implanted.

The first implantable pin can have a maximal lateral extent in a range of about 1 mm to about 4 mm and has a longitudinally extending center axis and, at least when implanted, can also have a radius of curvature that corresponds to a curvature of a trabecular bone load path of a normal trabecular bone.

The at least one implantable pin can have at least one rib that extends over at least a major portion of a length thereof. A lateral cross-sectional shape of the first implantable pin can have a perimeter with a plurality of valleys and projections.

The at least one rib can include at least one spirally extending rib.

The at least one rib can include at least one longitudinally extending straight rib.

The at least one rib can include at least one major rib and a plurality of minor ribs that extend outward from a longitudinally extending center axis. The plurality of minor ribs can extend outward from the center axis a lesser distance than the at least one major rib and can have a lesser thickness than the at least one major rib.

The plurality of minor ribs can include rib segments that are angularly offset from and extend between adjacent segments of the at least one major rib. The at least one major and the plurality of minor ribs can cooperate to provide resistance to bending while allowing the injectable material to pass about outer surfaces of a respective implantable pin.

The at least one implantable pin can be formed from a material comprising titanium, cobalt chromium, stainless steel, magnesium, carbon fiber, or PEEK or combinations or derivatives thereof.

The at least one implantable pin can have a maximal outer diameter of 5 mm (and optionally a minimal outer diameter of 0.75 mm or 1 mm) with at least one spirally extending rib on an outer surface thereof, optionally with a plurality of spaced apart fluid ports positioned in a spiral pattern along a length of the first and second implantable pins.

The injectable material can include or be a non-cytotoxic and/or biocompatible bone filler such as PMMA, Calcium Phosphate, or Magnesium Oxide.

The system can further include at least one pin cap, optionally a PEEK expandable plug. The at least one pin cap can be configured to provide a landing for an end of the at least one implantable pin against a cortex of the femur.

Embodiments of the present invention are directed to an implantable medical truss system for target bone. The truss system includes a plurality of spaced apart implantable pins adapted to reside in the target bone. In position, the implantable pins are configured to have different and intersecting trajectories. The implantable pins can have a cross-sectional shape defining an outer perimeter of a plurality of valleys and projections. In position, at least some of the implantable pins are configured to have segments that couple to each other and/or that overlap with each other in different planes.

Each of the implantable pins, in position, is coupled to and surrounded by a respective solid composite column.

At least some of the implanted pins can have a radius of curvature defining a length dimension.

A first implantable pin of the implantable pins can have opposing first and second end portions and can curve outward, and in position, can be configured to be curved outward in a direction toward a proximal end of a femur. A second implantable pin of the implantable pins can curve outward and has opposing first and second end portions, and in position, can curve outward in a direction opposite the first implantable pin. In position, the first end portion of the first implantable pin can be coupled to the first end portion of the second implantable pin and the second end portion of the first implantable pin can be coupled to the second end portion of the second implantable pin whereby the first and second implantable pins are interlocked to provide load bearing beams to form an internal truss within the target bone.

First and second implantable pins of the implantable pins can be configured to laterally extend over an entire lateral extent or substantially the entire lateral extent of a proximal end portion of a femur between a femoral head and greater trochanter to thereby define columns of load bearing beams that form an internal truss within the proximal end portion of the femur.

In position, a third implantable pin of the implantable pins can be configured to extend in a different plane and across a medial segment of one or both of the first and second implantable pins from a location under a lesser trochanter to a location proximate the proximal end of the femur between a femoral head and greater trochanter.

The implantable pins can have at least one of: (a) a solid core; (b) a maximal outer diameter of 5 mm; (c) at least one spirally extending rib on an outer surface thereof; (d) an open longitudinally extending channel in fluid communication with a plurality of spaced apart fluid ports positioned in a spiral pattern along a length of the implantable pins; or (e) an open longitudinally extending channel in fluid communication with a plurality of spaced apart elongate slots defining fluid ports through an outer wall thereby facilitating the implantable pins to be bent or shaped into a desired curvature.

Other embodiments of the present invention are directed towards methods of treating a fracture and/or structurally reinforcing target bone. The methods include: placing a needle in target bone; inserting an implantable solid pin into the needle prior to, during, or after the needle is placed in the target bone; flowably delivering a biocompatible and/or non-cytotoxic material into the needle and about the implantable pin while the implantable pin is held in the needle to provide an external column of the injectable material about the implantable pin; and withdrawing the needle from the target bone during the flowable delivery while leaving the implantable pin in position in the bone channel thereby implanting the implantable pin in the target bone with the external column of biocompatible and/or non-cytotoxic material coupled to the implantable pin and adjacent bone.

The placing the needle can be carried out by coupling the needle to a stylet and inserting the stylet and the needle together into cancellous bone of a target bone to directly form the bone channel without reaming the cancellous bone with a drill, then withdrawing the stylet leaving the needle in position in the target bone.

The method can further include repeating the placing, inserting, flowably delivering and withdrawing steps a plurality of times to implant a plurality of different implantable pins.

When solidified, the column of material can have a matrix of cancellous mixed with the column of material.

The method can include structurally coupling a plurality of the different implantable pins together to form an internal truss.

The different implantable pins are not required to be attached and can be spaced apart in the target bone.

When implanted, first and second implantable pins provided by the different implantable pins can laterally extend over an entire lateral extent or substantially the entire lateral extent of a proximal end of a femur between a femoral head and greater trochanter to thereby define load bearing beams that form the internal truss within the proximal end of the femur.

The implantable pins can include a first implantable pin and a second implantable pin. The placing and inserting steps can be carried out to place the first implantable pin to curve outward in a direction toward the proximal end of a femur and to then place the second implantable pin to curve outward in a direction opposite the first implantable pin.

The method can further include (directly or indirectly) coupling a first end portion of the first implantable pin to a first end portion of the second implantable pin and (directly or indirectly) coupling a second end portion of the first implantable pin to a second end portion of the second implantable pin whereby the first and second implantable pins are interlocked to provide load bearing beams to form an internal truss within target bone.

The implantable pins can further include a third implantable pin. The third implantable pin, in position, can extend in a different plane and across a medial segment of one or both of the first and second implantable pins from a location under a lesser trochanter to a location proximate the proximal end of the femur between a femoral head and greater trochanter.

The implantable pins can have a solid core.

The implantable pins can have a cross-sectional shape having a perimeter defined by a plurality of valleys and projections with a maximal lateral extent in a range of about 1 mm to about 5 mm. At least some of the implanted pins can have segments that (directly or indirectly) couple to each other and/or that overlap with each other in different planes, and wherein each of the implanted pins are coupled to and surrounded by respective solid columns.

The method can further include placing a cap on a leading end of the implantable pin and against a cortical bone before the flowably delivering step.

The method can further include cutting an end portion of one or more of the implantable pins for customized sizing prior to, during or after withdrawing the needle.

The flowably delivering can include flowing the biocompatible and/or non-cytotoxic material longitudinally along a length of the needle and flowing the material out of at least one flow port in the needle, in a direction toward cancellous bone.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Other systems and/or methods according to embodiments of the invention will be or become apparent to one with skill in the art upon review of the following drawings and detailed description. It is intended that all such additional systems, methods, and/or devices be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings.

FIGS. 2C, 2D, 2E and 2F are schematic illustrations of other example implant systems (also shown in a femur) according to embodiments of the present invention.

FIG. 7A is a top perspective view of a stylet for placing a needle for providing the implant systems according to embodiments of the present invention.

FIG. 7B is a top perspective view of an example needle detachably coupled to an implantable pin according to embodiments of the present invention.

FIG. 7C is an end view of a coupled needle and implantable pin according to embodiments of the present invention.

FIG. 7D is a top perspective view of the implantable pin shown in FIG. 7B.

FIGS. 8A-8D are schematic illustrations of an example sequence of actions for placing an implantable pin in target bone according to embodiments of the present invention.

FIG. 8E is a cross-sectional view of an example detachably coupled needle and implantable pin according to embodiments of the present invention.

FIG. 8F is a schematic illustration of a set of cooperating stylet, needle and implantable pin according to embodiments of the present invention.

FIGS. 9A-9D are schematic illustrations of an example sequence of actions for delivering flowable material to the implantable pin according to embodiments of the present invention.

DETAILED DESCRIPTION OF EMBODIMENTS OF THE INVENTION

Figure 1:
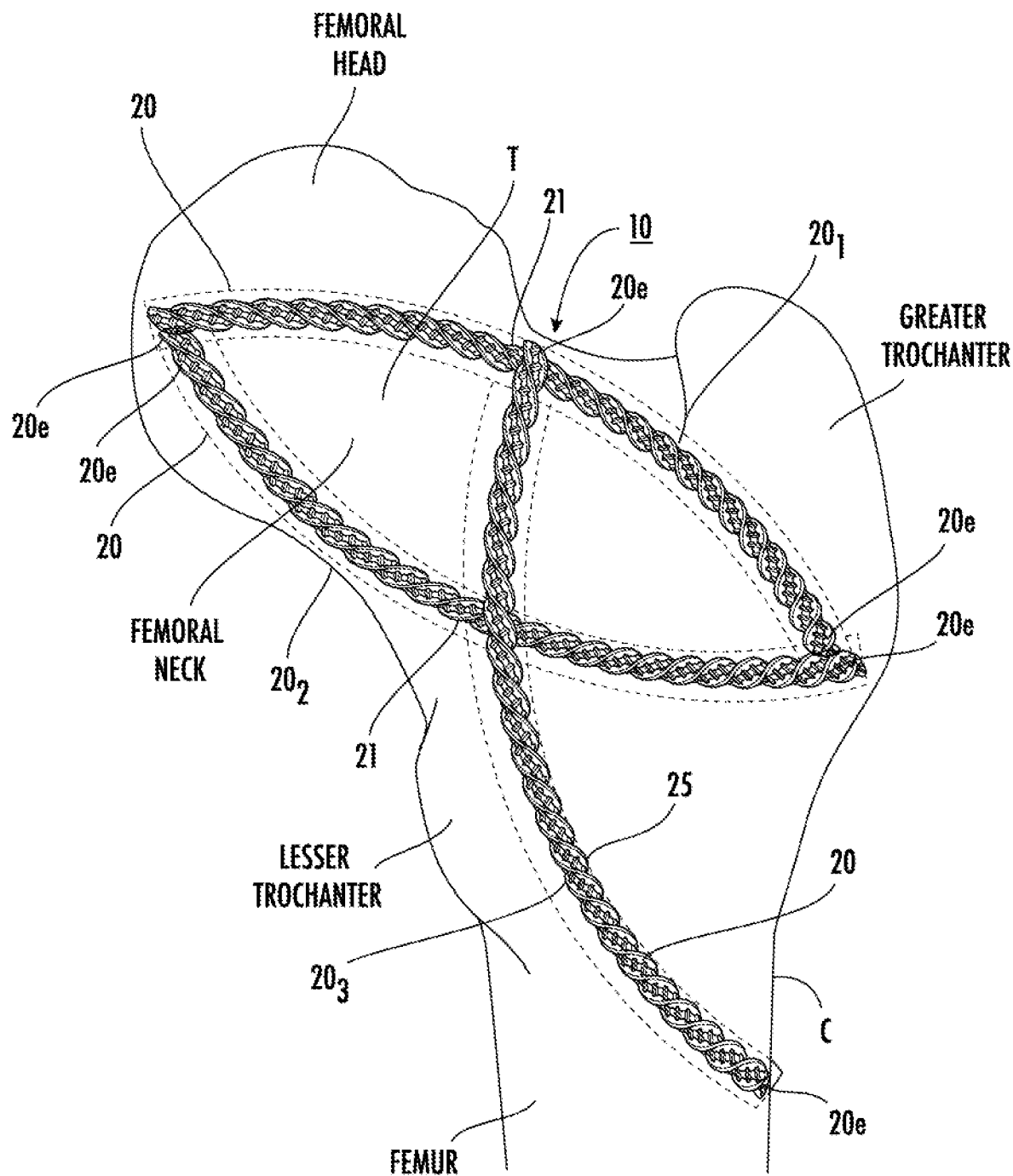
FIG. 1 is a schematic illustration of an example implant system shown in a femur according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. One or more features shown and discussed with respect to one embodiment may be included in another embodiment even if not explicitly described or shown with another embodiment. The term "Fig." (whether in all capital letters or not) is used interchangeably with the word "Figure" as an abbreviation thereof in the specification and drawings. In addition, the sequence of operations (or steps) is not limited to the order presented in the claims unless specifically indicated otherwise.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise. In the claims, the word "a" with respect to an element is intended to include one or more of such elements and is not limited to a single such element unless stated otherwise.

The term "about" means that the recited number or value can vary by +/−20%.

The term "substantially" when referring to a feature or element placement or dimensional extent means that the feature or element can vary in size, dimensional extent or placement by about +/−30%. For example, when stating that the implantable pin can extend substantially the entire lateral extent of a proximal end portion of a femur between a femoral head and greater trochanter, this refers to a distance, between two end locations between cortical bone at the femoral head and the greater trochanter with one or both of those end locations being spaced inward from the cortical bone by about 15 mm or less or extending into the cortical bone, e.g., one or both end locations can abut the adjacent cortical bone or reside inward from the external surface of the cortical bone a distance less than 15 mm.

Embodiments of the invention are suitable for human or animal use, and are particularly suitable for human use.

Referring to FIG. 1, a femur bone is shown, by way of example, with an implanted implant system 10. The implant system 10 includes a plurality of implantable pins 20 that extend in different directions across lengths of cancellous bone T, typically with one or more of the implanted pins 20 having a length sufficient to place one or both end portions 20e of a respective implantable pin 20 proximate or adjacent cortical bone C. As is well known, cortical bone "C" is a dense outer surface of bone that forms a protective layer around an internal cavity. This type of bone, also known as compact bone, has high resistance to bending and torsion. Compared to cortical bone, which is the other type of osseous tissue, cancellous bone "T", also called trabecular bone or spongy bone, has a higher surface area but is less dense, softer, weaker, and less stiff.

The implantable pin 20 can comprise medical grade materials such as titanium, stainless steel, cobalt chromium, polyetheretherketone (PEEK), carbon fiber, ceramics, carbon fiber reinforced composites, and combinations thereof. The implantable pin 20 can be sufficiently stiff and tough to be able withstand normal loading and/or bending. The implant system 10 can include one or multiple implantable pins 20. Where multiple pins 20 are used, each can be of the same configuration and material or the implantable pins 20 can have a different configuration and/or a different material(s). The implantable pin(s) 20 can have a maximal cross-sectional area or extent in a range of 1-5 mm, including 1 mm, 1.25 mm, 1.5 mm, 1.75 mm, 2 mm, 2.25 mm, 2.5 mm, 2.75 mm, 3 mm, 3.25 mm, 3.5 mm, 3.75 mm, 4 mm, 4.25 mm, 4.5 mm, 4.75 mm and 5 mm. The implantable pin(s) 20 can have a minimal cross-sectional area that is greater than 0.25 mm, such as greater than or equal to 0.5 mm, 0.75 mm or 1 mm.

As shown in FIG. 1, the implant system 10 includes at least one implantable pin 20. The at least one implantable pin 20 can be provided as a plurality of implantable pins 20, such as in a range of 2-15 or more pins 20, including 2, 3, 4, 5, 6, 7, 8, 9, 10, 11, 12, 13, 14 and 15 pins.

FIG. 1 illustrates three implantable pins $20_1$, $20_2$, $20_3$. In the example shown in FIG. 1, when implanted, the first and second implantable pins $20_1$, $20_2$ are configured to laterally extend over an entire lateral extent or substantially the entire lateral extent of a proximal end portion of a femur between cortical bone at a femoral head and greater trochanter to thereby define columns of load bearing beams that form an internal truss within the proximal end portion of the femur. As is also shown, the third implantable pin $20_3$ can be configured to extend in a different plane and across a medial segment 21 of one or both of the first and second implantable pins $20_1$, $20_2$ from a location under a lesser trochanter to a location above the lesser trochanter and proximate the proximal end of the femur between the femoral head and greater trochanter. The term "medial segment" refers to a location between opposing ends of a respective implantable pin that is closer to the center than an end of a respective implantable pin.

Figure 2A:
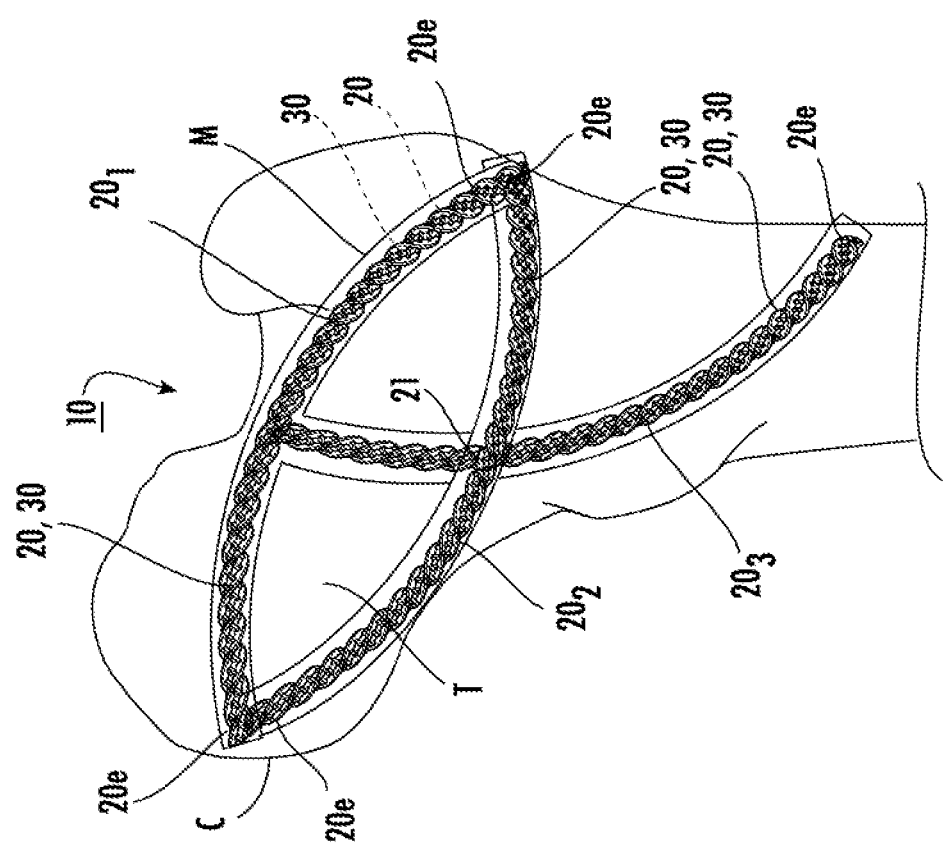
FIG. 2A is a schematic illustration of another example implant system (also shown in a femur) according to embodiments of the present invention.

FIG. 2A illustrates that the implantable pins 20 can each include a column of solid material 30 extending about, typically enclosing and coupled to external surfaces of a respective implantable pin 20. The solid material 30 can be any suitable injectable non-cytotoxic and/or biocompatible material. The solid material 20 can be clinically approved non-cytotoxic and/or biocompatible bone filler such as poly (methyl methacrylate) (PMMA), calcium phosphate, or magnesium oxide or combinations thereof. The column material 30 can optionally include fiber reinforcement.

Figure 3A:
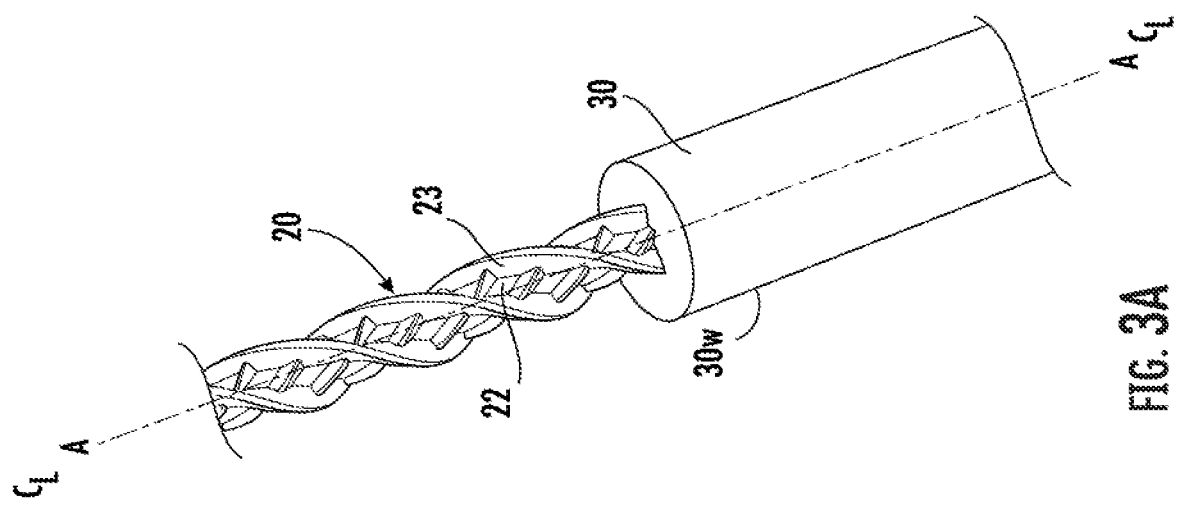
FIG. 3A is an enlarged side perspective view of an implantable pin shown coupled to a column of material according to embodiments of the present invention.
Figure 3B:
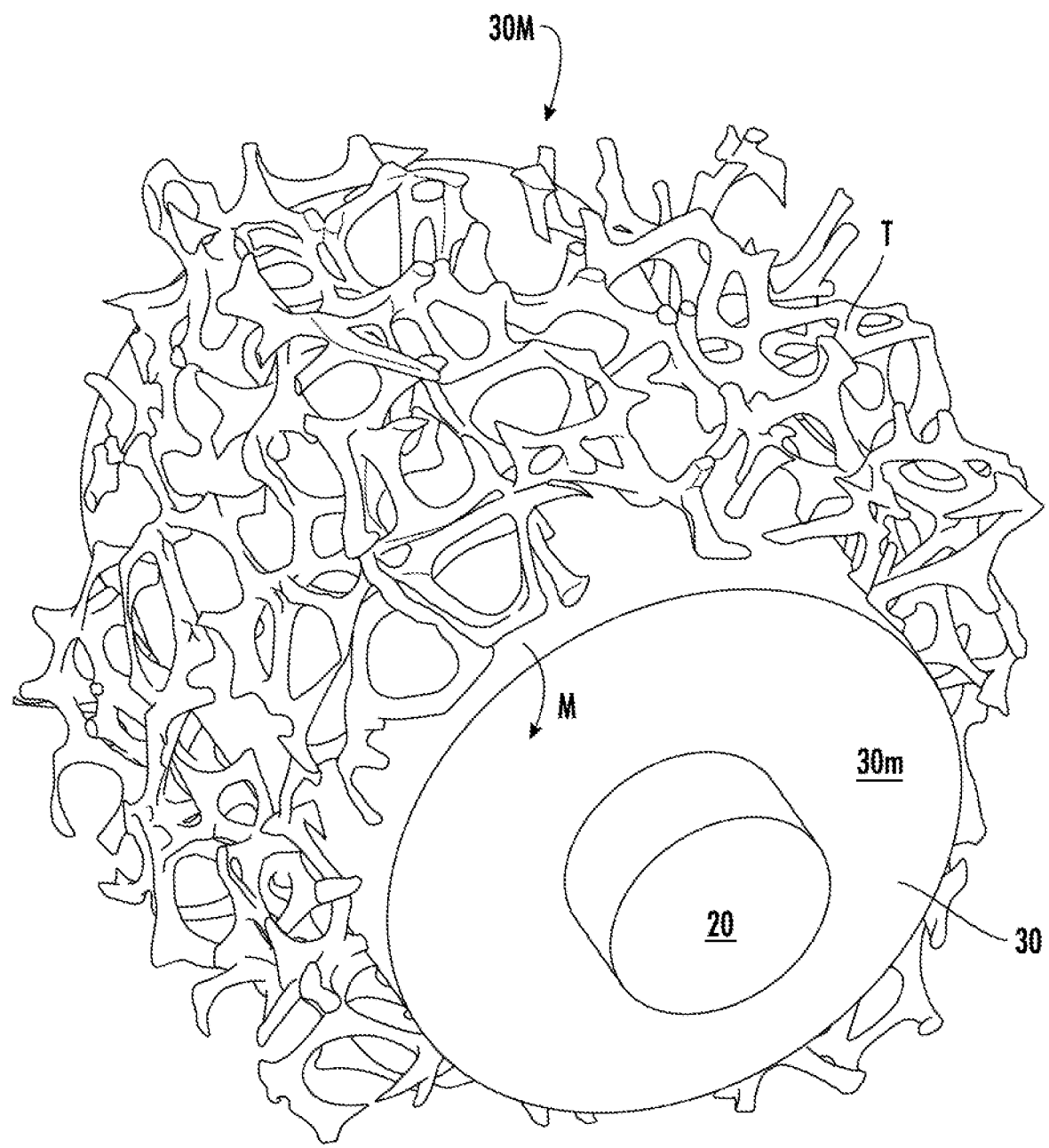
FIGS. 3B-3D are schematic illustrations of an in vivo column of material defined by a cancellous bone matrix and injectable, solidified, material according to embodiments of the present invention.
Figure 3C:
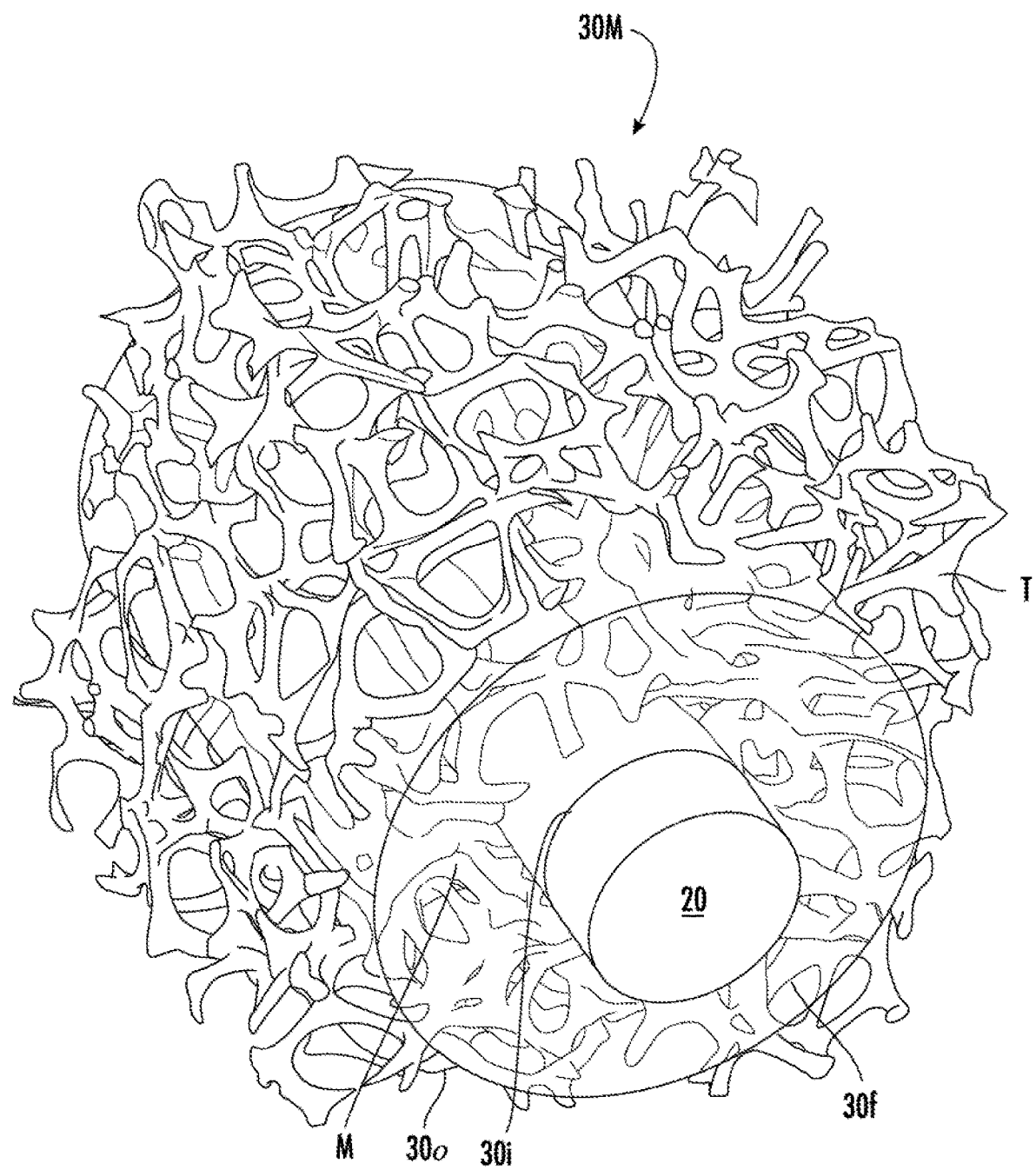
Figure 3D:
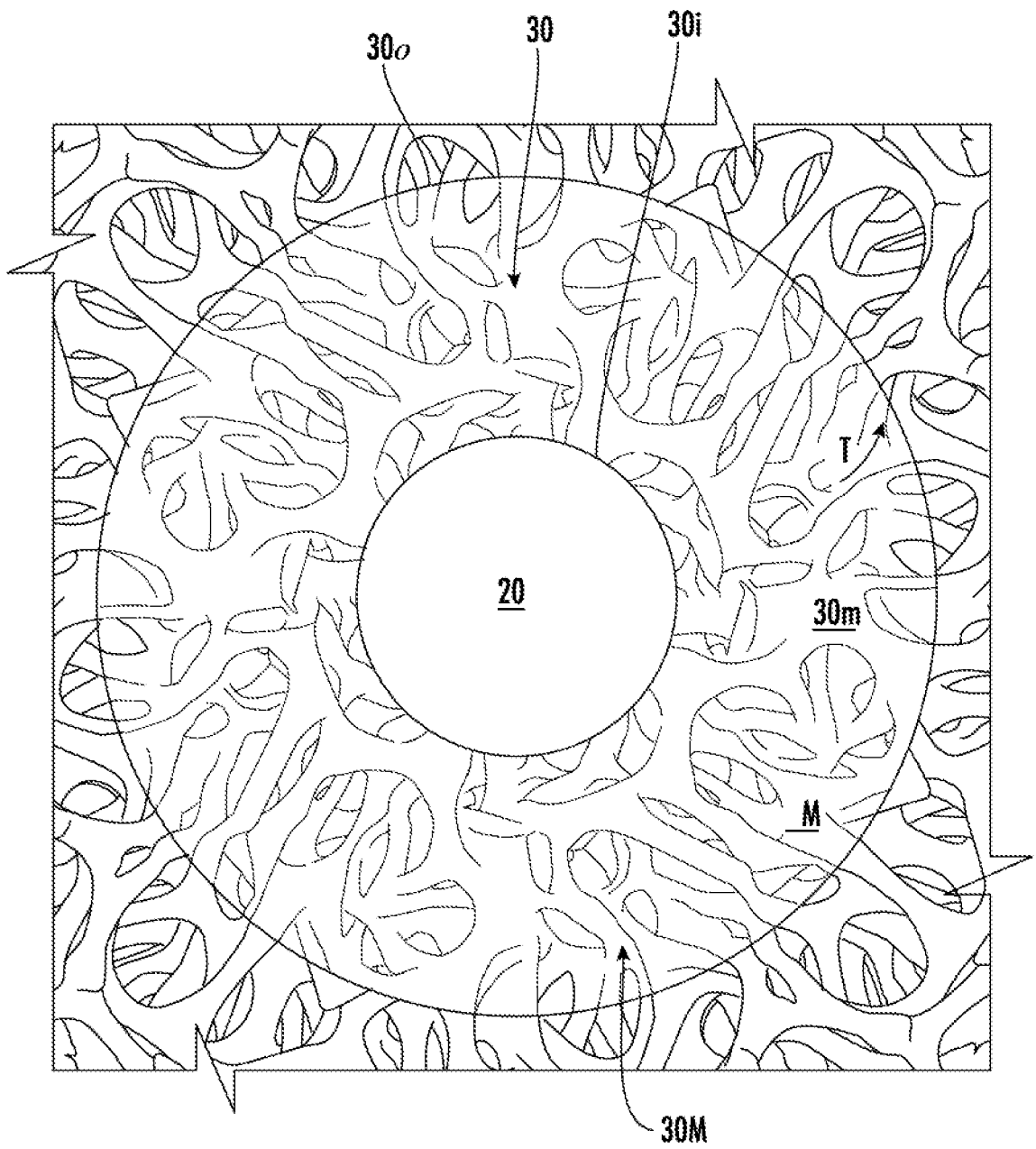

When dispensed in vivo and/or solidified, the column of material 30 can comprise a mixture 30M of the flowable/injectable material 30m (i.e., bone cement and/or bone filler) and cancellous bone matrix M (FIG. 2A, 3B-3D). Referring to FIGS. 3B-3D, the mixture 30M defining the external column of material 30 about the pin 20 can include the cancellous bone T (e.g., cancellous bone matrix M) and the flowable/injectable material 30m. FIGS. 3C and 3D illustrate a mixture 30M forming the column of material 30 with the solidified injectable material 30f partially transparent with an inner diameter adjacent and coupled to the pin 20 and an outer diameter 30o. There can be an increased density of cancellous bone T at the outer diameter 30o relative to the inner diameter 30i. There can be a gradient of decreasing density of cancellous bone T across a lateral cross section of the column 30 from the outer diameter to the inner diameter 30i. There can be a relatively constant density across the lateral cross-section. A lesser amount of (or no) cancellous bone T may extend to or reside at the inner diameter 30i of the column of material 30.

When solidified, the column of material 30 can be flexible (unable to hold its formed shape without support), semi-rigid (able to hold its formed shape without support) or rigid.

The column of the material 30 is typically provided as an injectable and/or flowable formulation that is delivered in the flowable state in vivo and subsequently solidified about a respective pin 20 after the respective pin 20 is in position in target bone as will be discussed further below. The exogenous (injectable/flowable material) part of the column of material 30 can be resorbable, nonresorbable or partially resorbable. The column of material 30 can comprise osteostimulatives.

Figure 5:
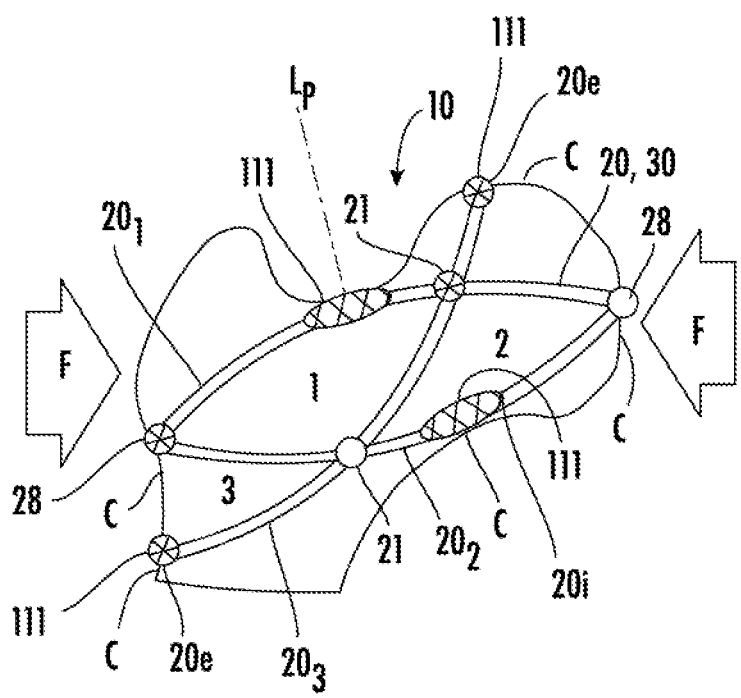
FIG. 5 is a schematic illustration of another example implant system comprising a plurality of implantable pins implanted in target bone according to embodiments of the present invention.

The implantable pins 20 can be curved as shown in FIGS. 1, 2A and 5, or one or more of the implantable pins 20 can be straight as shown in FIGS. 2B-2F. Combinations of at least one straight pin and at least one curved shape pin, when implanted, can also be used.

To be clear, while embodiments of the invention contemplate that the implantable pins 20 can be combined with the column of composite material 30, other embodiments contemplate that the implantable pins 20 do not require the column of composite material. Thus, the configurations of the implant systems 10 shown by way of example in different figures may be used without requiring the column of composite material 30.

Figure 2B:
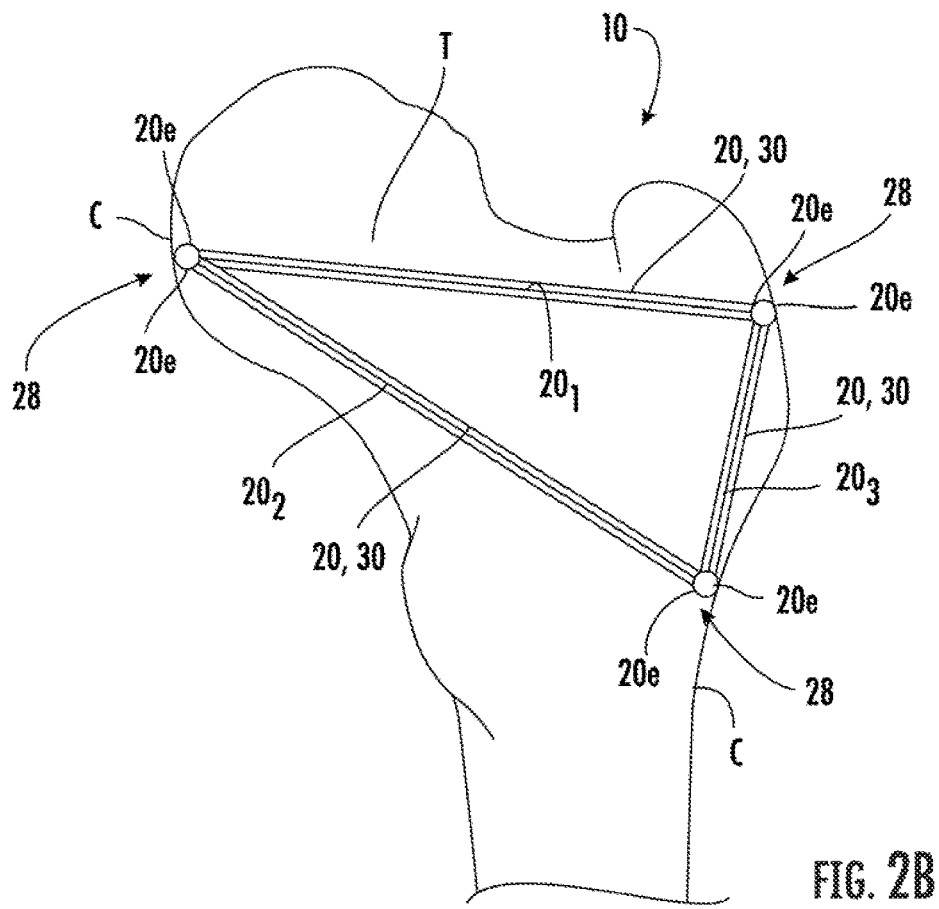
FIG. 2B is a schematic illustration of another example implant system (also shown in a femur) according to embodiments of the present invention.

FIG. 2B also illustrates that the implant system 10 can include three implantable pins 20 with opposing end portions 20e and each of the end portions 20e can reside adjacent cortical bone C. A pair of different implantable pins 20 can be coupled together to define a coupling joint 28, which may reside at one or more end portions 20e or at different segments. One or more of the implantable pins 20 can have end portions 20e that are not connected with other implantable pins 20. End portions 20e of two or more of the implantable pins 20 can reside in the cancellous bone T in different planes from each other, optionally in aligned or offset but adjacent locations in a front-to-back and/or anterior-posterior direction.

Figure 2C:
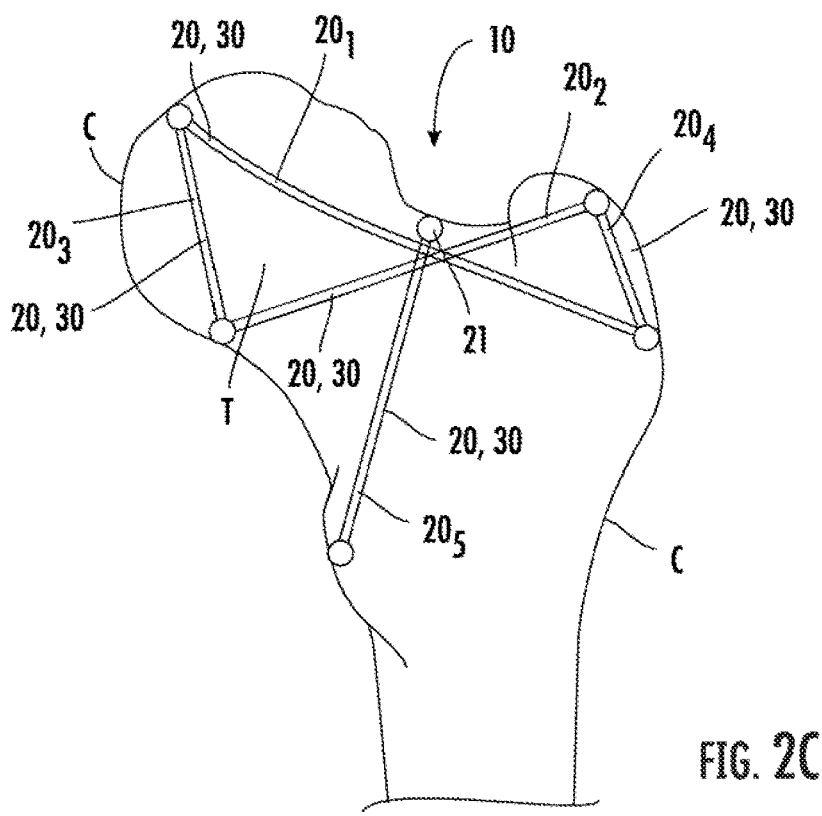

FIG. 2C illustrates an example implant system 10 with five implantable pins $20_1$, $20_2$, $20_3$, $20_4$, $20_5$. As shown, some of the pins, shown as three of the pins $20_1$, $20_2$, $20_5$, can be longer than others, the shorter pins shown as pins $20_3$, $20_4$. In some particular embodiments, one or more of the shorter pins 20, shown as pins $20_3$, $20_4$, can have a length that is 30-70% the length of one or more of the longer pins, shown as pins $20_1$, $20_2$, $20_5$.

Figure 2D:
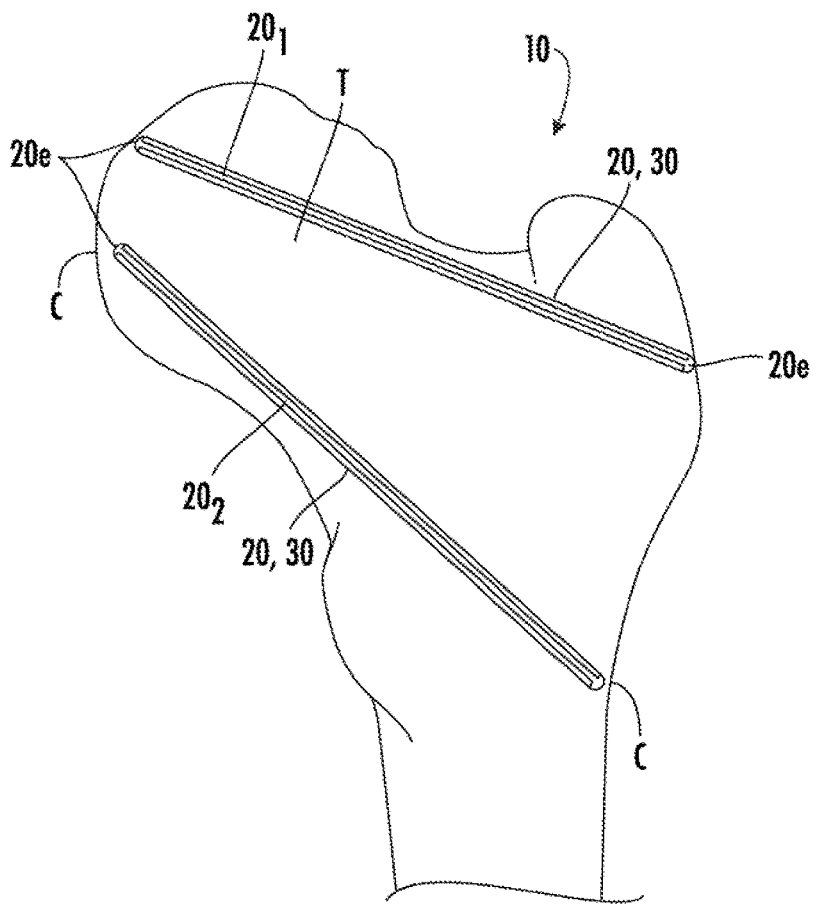

FIG. 2D illustrates another example of an implant system 10 with two spaced apart pins $20_1$, $20_2$ extending at different angles across an implant zone without a coupling joint.

Figure 2E:
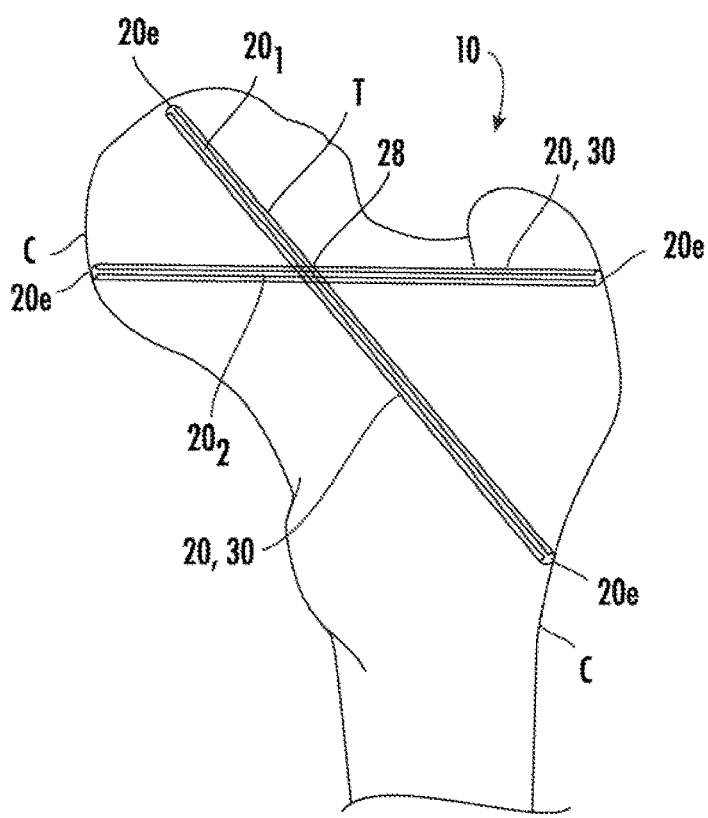

FIG. 2E illustrates another example of an implant system 10 with two spaced apart pins $20_1$, $20_2$ extending at different angles across an implant zone and intersecting to form one coupling joint 28.

FIG. 2F illustrates another example of an implant system 10 with three spaced apart pins $20_1$, $20_2$, 203 extending at different angles across an implant zone with one pin $20_2$ defining a coupling joint 28 with each of the other two pins $20_1$, $20_3$. The pin $20_2$ can extend longitudinally and at a first angle from horizontal and the other two pins $20_1$, $20_3$ can extend laterally and at different angles from horizontal, and, as shown pin $20_2$ can extend at a greater angulation from horizontal than the pins $20_1$, 203.

Figure 6:
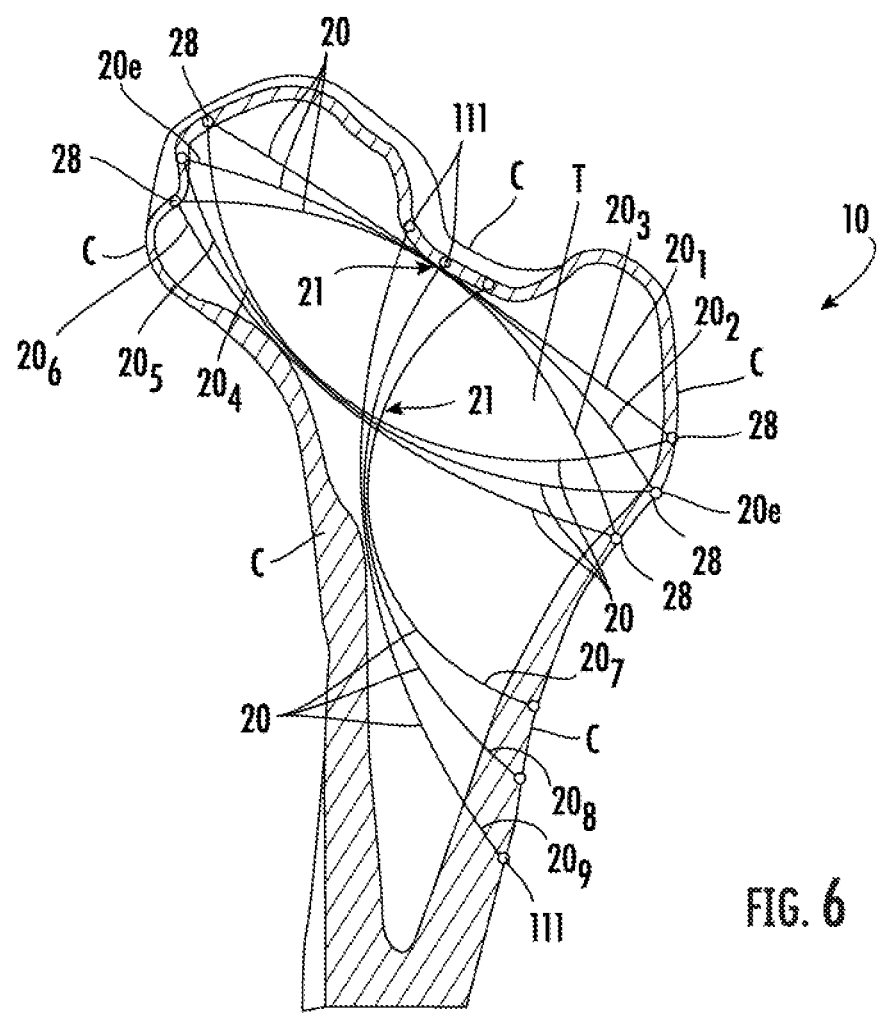
FIG. 6 is a schematic illustration of another example implant system according to embodiments of the present invention.

FIG. 3A illustrates an example implantable pin 20, shown partially exposed relative to the column of solid material 30 to better illustrate features of the implantable pin 20. The column of material 30 can have a cylindrical outer wall 30w that can be defined by a shape of a channel wall 40w of a needle 40 (FIG. 6). The outer wall 30w of the column of material 30 can be smooth, porous or rough. The outer wall can extend through a trabecular network of bone. The column of material 30 can vary in its diameter or cross-sectional size/width along the length of the implantable pin 20. The column of material 30 can have a constant outer diameter over at least a major portion (50%) of its length.

The implantable pin 20 can have an axially or longitudinally extending centerline or axis A-A and outer surface features defining valleys 22 and projections 23.

Figure 4:
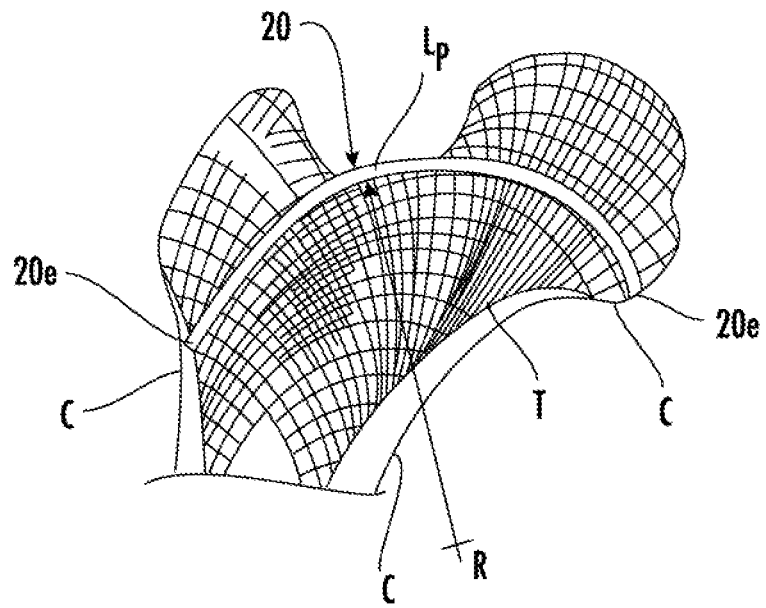
FIG. 4 is a schematic illustration of an example implanted pin having a curvature corresponding to that of normal trabecular bone according to embodiments of the present invention.

As shown by the line patterns in FIG. 4, cancellous bone T includes plates (trabeculae) and bars of bone. These plates are adjacent to small, irregular cavities that contain red bone marrow. The trabeculae are arranged to provide maximum strength similar to braces that are used to support a building. The trabeculae of spongy bone follow the lines of stress and can realign if the direction of stress changes. In osteoporosis, cancellous bone T is more severely affected than cortical bone C. One or more of the implantable pins 20 of the implant system 10 can be placed and configured to mimic a natural load path of a trabeculae stress line Lp as shown in FIG. 4. Thus, the implantable pin 20 can have a curved configuration with a radius of curvature R that corresponds to the natural load path Lp and the implantable pin 20 can have a length that extends across a lateral extent of the proximal femur to cortical bone C.

FIG. 5 illustrates another implant system 10 with three implantable pins 20 and respective columns of material 30. The implant system 10 can provide a triangle-like tress support in cancellous bone T.

FIG. 6 illustrates another embodiment of an implant system 10 comprising nine implantable pins $20_1$-$20_9$. Three adjacent pins $20_7$-$20_9$ extend across medial segments 21 of six other pins, $20_1$-$20_6$. FIG. 6 also illustrates example curvatures of a pin implant system 10 within a single femur geometry.

Referring to FIGS. 2A, 2B, 4-6, the end portions 20e of one or more of the implantable pins 20 can extend into or abut adjacent cortical bone C at an interface 111. Referring to FIG. 5, an intermediate segment 20i of one or more pins 20 can contact cortical bone C at an interface 111.

Referring to FIGS. 2A, 2B, 5 and 6, adjacent end portions 20e and/or medial segments 21 of different pins $20_1$, $20_2$ can terminate at an adjacent cortical bone location, optionally coupled together at a coupling joint 28.

Referring to FIGS. 2A, 2C, 2E, 2F, 5 and 6, one of the pins $20_3$ can have a trajectory that extends across a segment of one or both of the other pins $20_1$, $20_2$, either in the same plane or in a different plane.

One or more of the pins $20_3$ (FIGS. 2A, 5) or $20_5$ (FIG. 2C) or $20_7$-$20_9$ (FIG. 6) can extend across a medial segment 21 of another one or more pin $20_1$, $20_2$ (FIGS. 2A, 2C, 5) or $20_1$-$20_6$ (FIG. 6).

FIG. 7A illustrates a stylet 50. The stylet 50 is configured to slidably receive the needle 40 (FIG. 7B). The stylet 50 can have a sharp tip 50t. The tip 50t can be adjacent an open end. The stylet 50 can extend inside the needle 40 as shown in FIGS. 8A-8B. Alternatively, the stylet 50 can be external of the needle 40 and may have an open or closed end (not shown) forming the sharp tip 50t.

The stylet 50 can have rigidity sufficient to form a bone channel in cancellous bone T to thereby place the at least one needle 40 into the target bone directly using the stylet 50 without requiring reaming a bone channel with a drill. A drill, chisel or other tool may optionally be used to initiate a bone channel path through cortical bone C. The stylet 50 can be straight as shown in FIG. 7A or curved as shown in FIGS. 8A-8D. The curved configurations can be used when it is desired to place a curved implantable pin 20 (FIG. 8D).

The needle 40 and stylet 50 can comprise a defined length, diameter and bend radius associated with a curved configuration. The needle 40 and/or stylet 50 can comprise stainless steel. The needle 40 and/or stylet 50 can comprise a nitinol material that can allows for flexibility in bend radius and/or directional injection ports to better control injection shape of filler material.

Figure 7E:
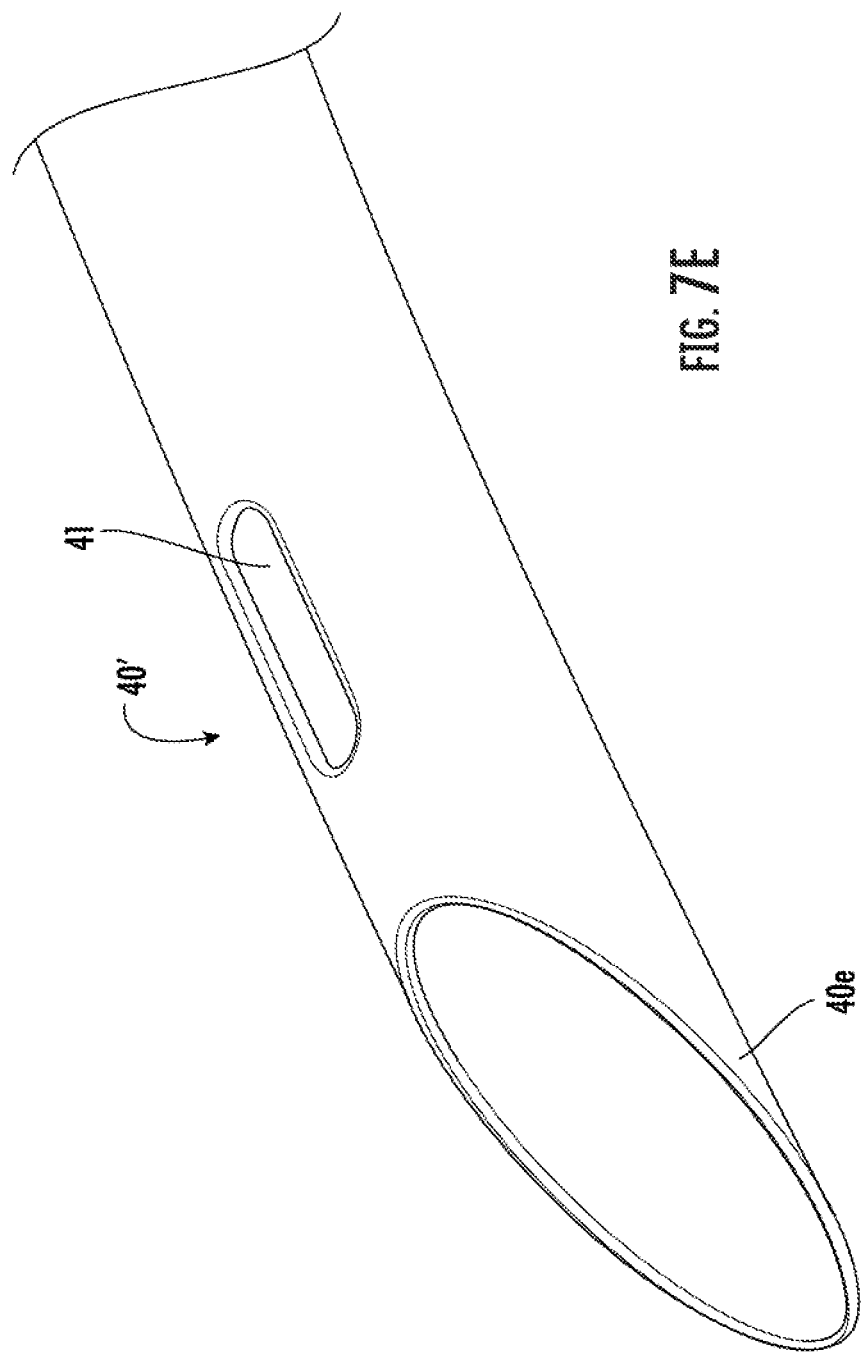
FIG. 7E is an enlarged view of a leading end portion of an example needle that can slidably receive an implantable pin according to embodiments of the present invention.

FIG. 7E illustrates that the needle 40' can have a tapered leading end 40e and at least one injection port 41 to dispense the injectable material 30m. The needle 40' can slidably hold a respective implantable pin 20, then retract to leave the implantable pin in position. The at least one injection port 41 can be elongate. The injection port 41 can be oriented to be longitudinally straight as shown or may be oriented to circumferentially or spirally extend (not shown).

Referring to FIGS. 7B and 7C, the needle 40 is sized and configured to detachably and slidably couple to an implantable pin 20. The pin 20 is shown outside the needle in FIG. 7D. The needle 40 can be cylindrical (tubular) with an open center channel 40c surrounded by a longitudinally extending wall 40w. The wall 40w can have a closed outer surface whereby no fluid can flow through the wall 40w.

Referring to FIGS. 7C and 8E, the needle 40 can have a close tolerance with a gap space between the maximal outer cross-sectional dimension of the pin 20 and the (inner surface of) wall 40w of the needle 40 that is in a range of 0.1 mm to 3 mm, more typically in a range of about 0.1 mm to about 1.5 mm. The close dimensional tolerance can allow for a minimally invasive medical procedure with a small needle to place the implant system 10 with a suitable pin diameter (sufficiently large) to provide structural reliability/improvement.

Referring to FIG. 8E, the implantable pins 20 can have a lateral cross-sectional shape of projections 21 and valleys 22 (recesses) thereby allowing flowable material to flow over a length dimension of the implantable pin 20 at least through the valleys 22 while held inside the needle 40. This sizing can reduce or minimize the amount of injectable material used for each implantable pin 20 while providing a desired column of material about the implantable pin 20, so that the column of material 30 encloses the pin 20 over 360 degrees and extends from a leading implanted end portion 20e to a trailing end portion 20e of the implantable pin 20. The wall 40w can provide a structural boundary for the injectable material, not relying on the bone channel wall, thereby directing the flowable material during its delivery and helping to shape an outer wall of the column of material 30.

The needle 40 is typically used to serially place each of the implantable pins 20 of the implant system 10 for a respective patient procedure for a target bone. The needle 40 can cooperate with a delivery device 200 (FIG. 9A-9D) to inject the flowable material 30f that forms the column of material 30, serially about a respective implantable pin 20 before placing another implantable pin. However, more than one needle 40 may be used, such as one needle 40 for each implantable pin 20 or one needle 40 for different subsets of implantable pins (not shown). The needle 40 can range in diameter from a 7-gauge to a 12-gauge needle, e.g., be a 7 gauge needle, an 8 gauge needle, a 9 gauge needle, or even a 10-12 gauge needle. The needle 40 can have a nominal inner diameter of about 4 to about 2 mm and a nominal outer diameter of about 5 mm to about 2.77 mm.

Referring to FIGS. 8A-8D, an example sequence of actions to place a respective implantable pin 20 is shown. The needle 40 and stylet 50 are coupled as shown in FIG. 8A. While a series of pre-formed bone channels are shown in FIGS. 8B-8D, typically no pre-formed bone channels are required and each bone channel can be formed serially and after a prior bone channel has been loaded with the implantable pin 20 and column of material 30 (FIG. 9D). However, a clinician may have pre-operative planning to identify desired implantable pin trajectories, lengths and locations as well as a desired end configuration of a respective implant system 10, for a respective patient using any desired imaging modality. The use of a needle 40 used to form the bone channel 25 without removal from that bone channel 25 for placement of the implantable pin 20 and/or column of material 30 can facilitate a minimally invasive surgery as it can be difficult to locate a hole/bone channel once formed.

The needle 40 and stylet 50 can be inserted into target bone through cancellous bone C as shown by the arrow in FIG. 8B thereby cooperating to form a respective bone channel 25 in situ. The stylet 50 can be removed from the patient and decoupled from the needle 40, leaving the needle 40 in position as shown in FIG. 8C. The use of the needle 40 with a trailing end portion 42 extending out of the bone can provide increased visualization and control for a clinician for placing the implantable pin 20 and/or column of material 30 in a respective bone channel 25.

In some embodiments, as shown in FIG. 8F, the stylet 50 is configured to enclose the needle 40 while the needle 40 holds the implantable pin 20, and the stylet 50, needle 40 and implantable pin 20 can be inserted as a set into a respective bone channel 25. The stylet 50 can be removed, similar to FIG. 8C, leaving the needle 40 and implantable pin 20 in the bone channel 25.

It is also contemplated that the needle 40 can form the bone channel 25 without requiring a stylet 50. The needle 40 can have a leading end that is closed or open and configured to slice through cancellous tissue but not through cortical bone. The needle 40 can cooperate with a flexible drill to hold the drill bit that forms the bone channel 25 leaving the needle in place once the drill bit is withdrawn (not shown).

As shown in FIG. 8D, an implantable pin 20 can be inserted into the needle 40. Optionally, a pin cap 60 can be inserted into the needle 40 before the implantable pin 20 or the end cap 60 can be attached to a leading end of the pin 20 and pushed to exit the leading end 40e of the needle 40 to provide a load bearing element between the needle and adjacent bone, such as adjacent cortical bone C to help distribute load thereat. The cap 60 can be expandable, once it exits the needle 40. Thus, the cap 60 can provide a landing for the implantable pin 20 against a cortex of the femur in example embodiments.

Where the stylet 50, needle 40 and implantable needle 20 are inserted into a respective bone channel 25 as a set (FIG. 8F), with the stylet 50 and needle 40 cooperating to form the bone channel 25, the cap 60, where used, can be held inside the stylet 50 between the leading end of the needle 40e and the leading end of the stylet 50.

Referring to FIG. 9A, after the implantable pin 20 is in position in the bone channel 25 and inside the needle 40, a delivery device 200, optionally a syringe 200s, with flowable material 30f, e.g., flowable bone filler and/or bone cement, can be directly or indirectly coupled to the trailing end 42 of the needle 40. The delivery device 200 can comprise one or more sleeves or other delivery device members that can dispense the flowable material 30f.

Referring to FIGS. 9B and 9C, the flowable material 30f is dispensed toward the bone channel 25 from the delivery device 200 as the needle 40 is backed, slowly withdrawn, along its trajectory (indicated by the reverse arrow) while also with leaving a column of material 30 around the implantable pin 20. In some embodiments, where a syringe 200s is used as the delivery device 200, the movement of the needle 40 and plunger 200p of the syringe 200s can be manual or automated using an actuator, for example. The delivery device 200 can be configured to dispense a volume of flowable material at a controlled dispensing rate. The needle 40 can be withdrawn at a slower rate than the dispensing of the flowable material 30f.

Referring to FIGS. 9C and 9D, once the needle 40 reaches the end of the implantable pin 20, it can be removed, leaving the implantable pin 20 and coupled column of material 30 in the bone channel 25. FIG. 9C illustrates that another cap 60 may be inserted at the trailing end of the pin to help distribute load at the cap 60 and/or inhibit ejection while the pin 20 is setting/integrating into the bone channel 25.

Figure 10:
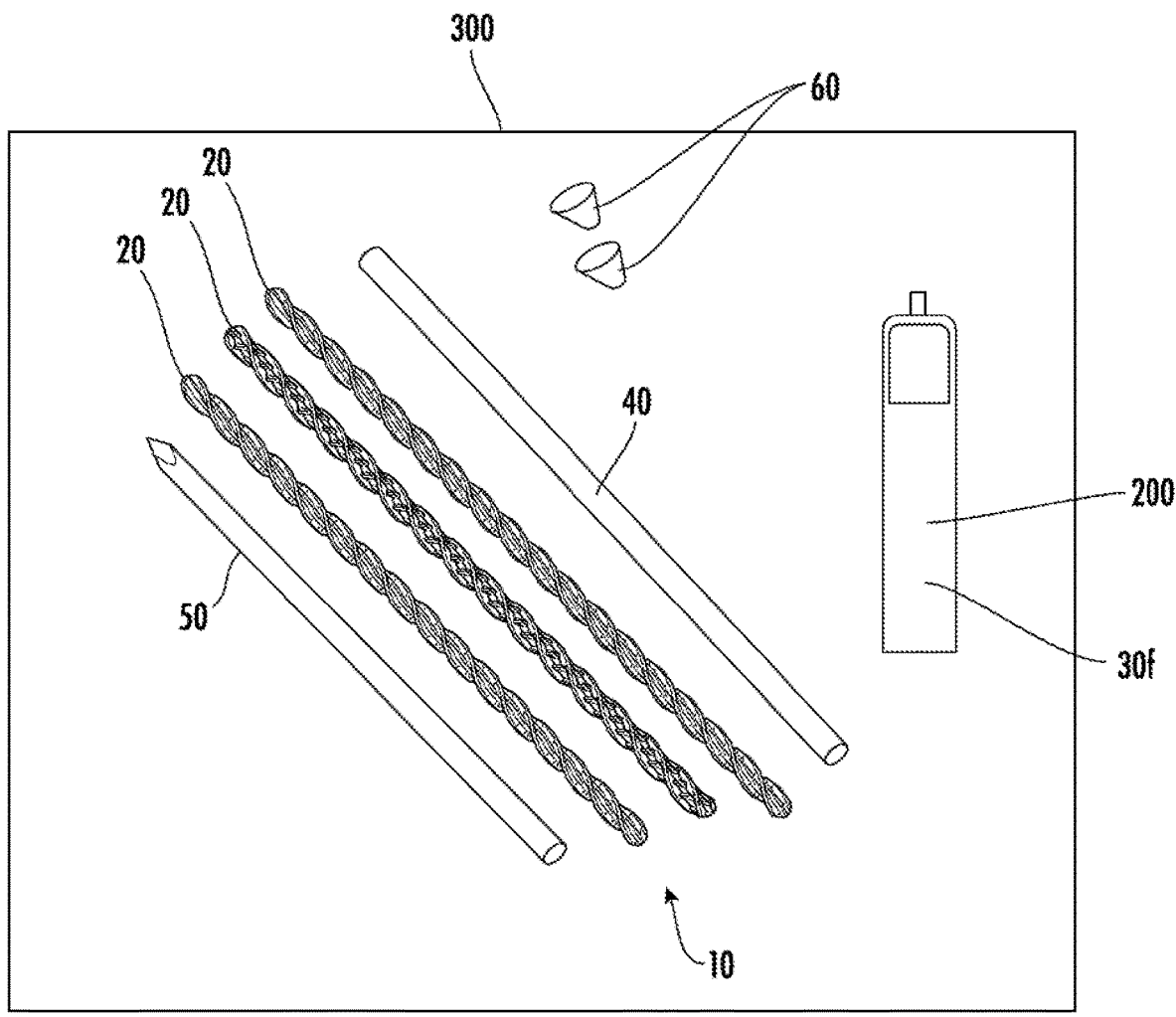
FIG. 10 is a schematic illustration of a kit and/or set of surgical tools for a surgery according to embodiments of the present invention.

FIG. 10 illustrates an example kit 300 of medical components providing the implant system 10 and surgical tools to place the implant system 10. The kit 300 includes a plurality of implantable pins 20, the needle 40, the stylet 50 and a delivery device 200 with flowable material 30f. The kit 300 can also include a plurality of caps 60.

The flowable material 30f can be pre-mixed or provided as separate chemical components that are mixed prior to use on site. The flowable material 30f can be held in a container separate from the delivery device 200 so that the pre-use container is not used for active delivery/dispensing. The flowable material 30f can be placed in the delivery device 200 at a use site. The injectable/flowable material 30f can be a composite material made from two or more different materials that, when combined, provide a structural and/or chemical advantage over those individual materials by themselves. The flowable material 30f can be in a foaming material state during delivery.

Embodiments of the invention provide a small diameter stylet 50, needle 40 and implantable pins 20. The implantable pins 20 can be cut to size in length or provided in different sizes, lengths and/or curvatures.

In some embodiments, the column of material 30 can be provided to minimize or reduce the volume of injectable material used over known hybrid and bone fillers used alone while also allowing for minimally invasive surgeries and without requiring open surgery. Example volumes of flowable material 30f that can be used to form a respective single column of material 30 about a corresponding implantable pin 20 is in a range of 1.5 ml to about 5.0 ml.

The stylet 50 can form the bone channel 25 for the needle 40 and/or the stylet 50 and needle 40 can cooperate to form respective bone channels 25. As discussed above, in some embodiments, no drill for reaming bone channels is needed. However, a (flexible) drill may be used.

The column of material 30 can define a bone cement interface between a solid core of the cancellous bone and outer surfaces of the implantable pin 20. As discussed above, the column 30 can be a mixture of injectable material 30f, e.g., bone filler and/or bone cement with cancellous bone matrix. The column 30 can have an increased amount of the cancellous bone matrix at its outer surface relative to its inner surface adjacent the pin 20.

Figure 12:
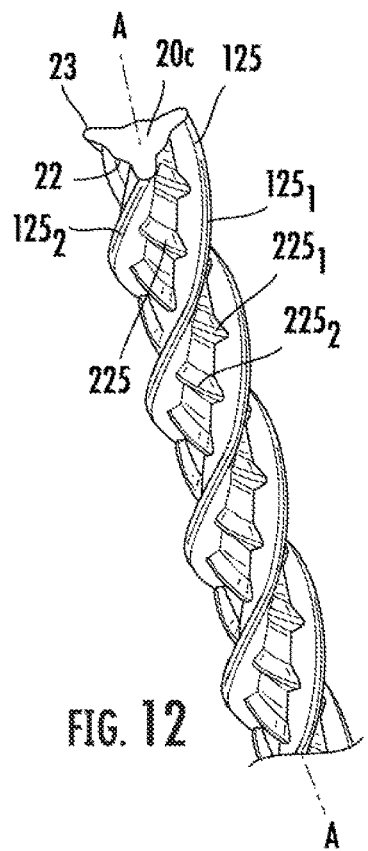
FIG. 12 is an enlarged, side perspective view of an example implantable pin according to embodiments of the present invention.
Figure 11:
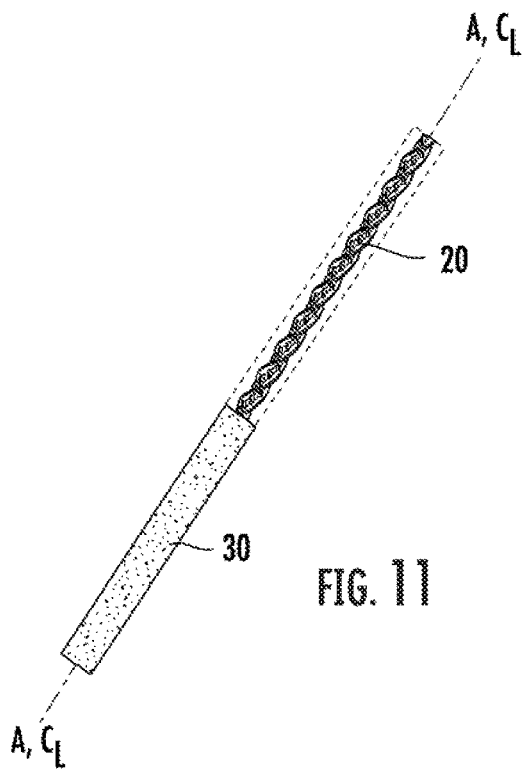
FIG. 11 is a side perspective view of an example implantable pin and column of material coupled thereto according to embodiments of the present invention.
Figure 13A:
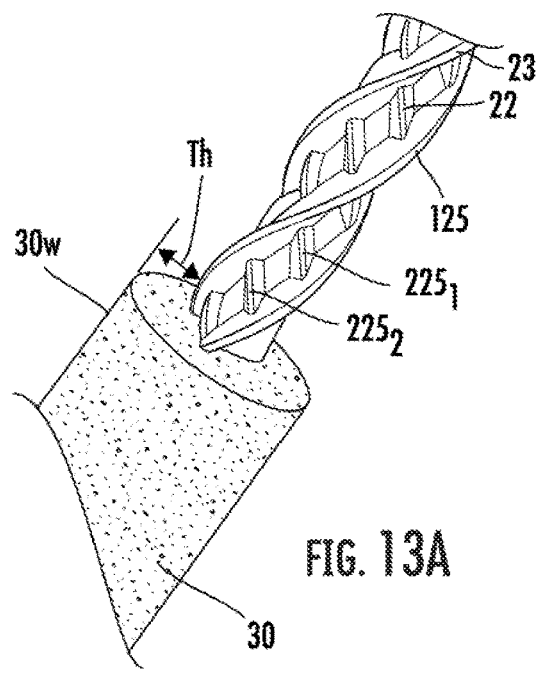
FIGS. 13A and 13B are enlarged, side perspective views of the pin shown in FIG. 11 with an external column of solidified material coupled thereto according to embodiments of the present invention.
Figure 13B:
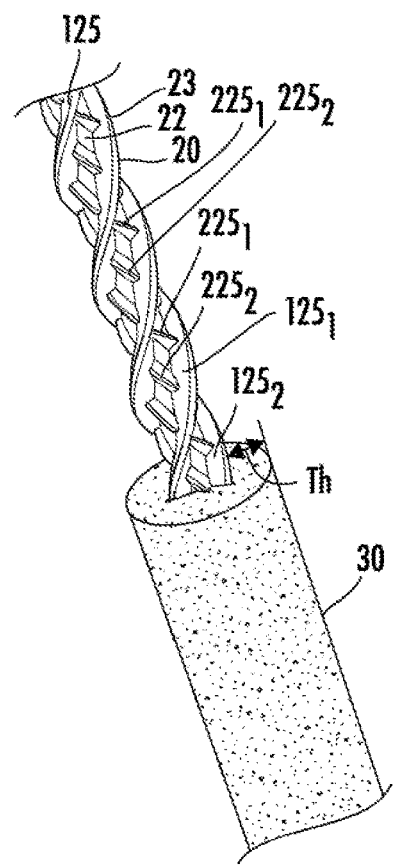

Referring to FIGS. 12, 13A and 13B, the implantable pin 20 can have an axially extending centerline A-A and a cross-sectional shape (FIG. 12) with an outer perimeter comprising (circumferentially) spaced apart valleys 22 and projections 23. The projections 23 can be sized and configured to be closely spaced apart from the wall 40w of the needle 40 (FIG. 8E) as discussed above.

The implantable pins 20 can have a solid center core 20c as shown in FIGS. 12 and 16-29.

Figure 14:
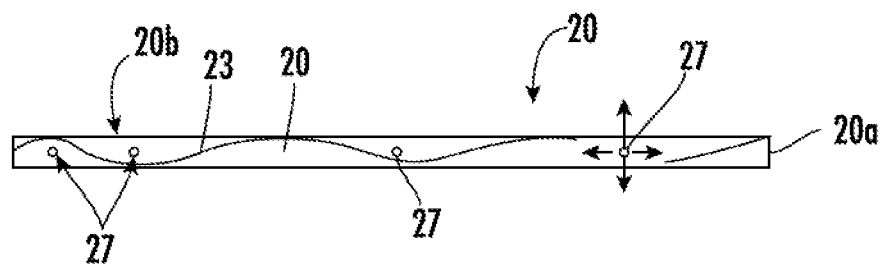
FIG. 14 is a schematic illustration of another embodiment of an implantable pin according to embodiments of the present invention.
Figure 15:
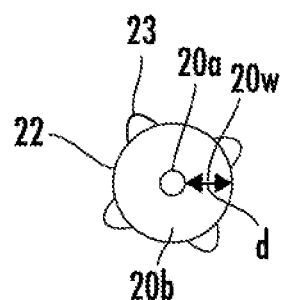
FIG. 15 is an end view of the implantable pin shown in FIG. 14.

The implantable pins 20 can have a relatively small open longitudinally extending open channel 20a as shown in FIGS. 14, 15. That is, the pin body 20b can have a wall 20w extending in the longitudinal direction that surrounds the channel 20a with a thickness "d" that is greater than a diameter or width of the channel 20a. The pin body 20b can also include a plurality of ports 27 that extend through the wall 20w and define flow ports 27 to allow the flowable material 30f to enter or exit therefrom.

FIGS. 30A-30E illustrate other examples of pins 20 with the flow ports 27 and open longitudinally extending channel 20a that is in fluid communication with the flow ports 27. The flow ports 27 can be elongate as shown in FIGS. 30A-30E. The flow ports 27 can be longitudinally spaced apart in a spiral pattern over the length of the pin 20 to facilitate a directional output flow of the injectable material 30f. The implantable pins 20 can have an open longitudinally extending channel 20a that is in fluid communication with a plurality of spaced apart elongate slots defining fluid ports 27 through an outer wall of respective implantable pins 20 thereby facilitating the implantable pins to be bent or shaped into a desired curvature.

The implantable pins 20 can have a radius of curvature R (FIG. 4, FIG. 29, FIG. 30D for example) defining a length dimension.

The implantable pins 20 can have a rough outer surface (versus smooth) for improving adherence of the flowable material 30f.

Referring again to FIGS. 12, 13A and 13B, the valleys 22 and projections 23 can be defined by at least one rib 125. The at least one rib 125 can provide increased contact surface area for coupling to the column of material 30 and/or provide resistance to bending when flowing the flowable material 30f about the implantable pin 20 when in a needle 40 during implantation of the implantable pin 20.

As shown in FIG. 12, the at least one rib 125 can be provided as a major rib and the implantable pin 20 can further comprise at least one minor rib 225 can extend in a different angle from the axis A-A than the major rib 125 and project outward from the axis A-A a lesser extent than the at least one major rib 125. The at least one minor rib 225 can have a lesser thickness than the at least one major rib 125.

The at least one rib 125 can be a spiral rib. As shown, there are two adjacent major ribs $125_1$, $125_2$ that are provided as spiral ribs and there are two minor ribs $225_1$, $225_2$ that are provided as minor spiral ribs that reside between neighboring segments of the adjacent major ribs.

Referring to FIGS. 13A and 13B, the column of material 30 can have an outer wall 30w with a thickness "Th" that is in a range of about 1 mm to about 10 mm. The thickness of the at least one implantable pin 20, measured at a maximal lateral/cross-sectional extent can be less, the same or greater than the thickness of the column of material 30.

Figure 16:
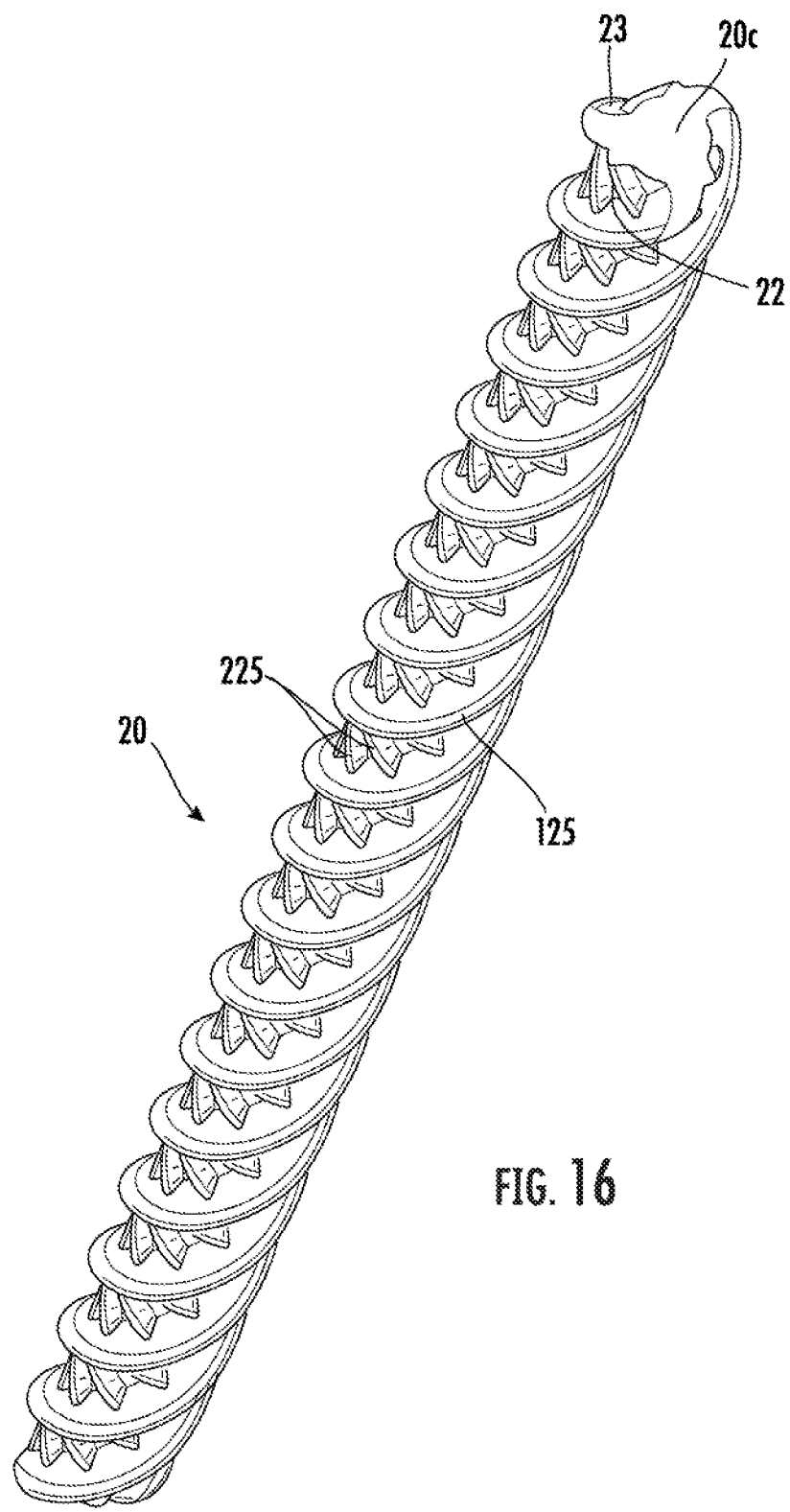
FIGS. 16-29 are schematic illustrations of examples of different implantable pin configurations according to embodiments of the present invention.
Figure 17:
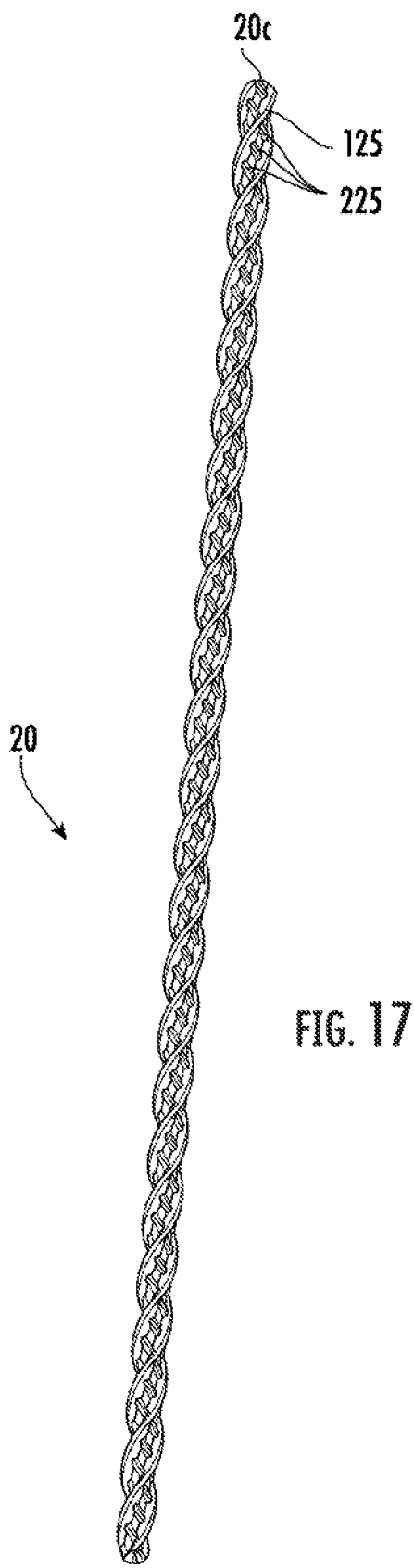

FIGS. 16 and 17 illustrate other embodiments of an implantable pin 20 that also includes at least one major rib 125 and at least one minor rib 225. The at least one major rib 125 has a spiral configuration. The at least one minor rib 225 is a plurality of minor ribs 225, typically between 2-10, all between respective neighboring spiral segments of the at least one major rib 125.

Figure 18:
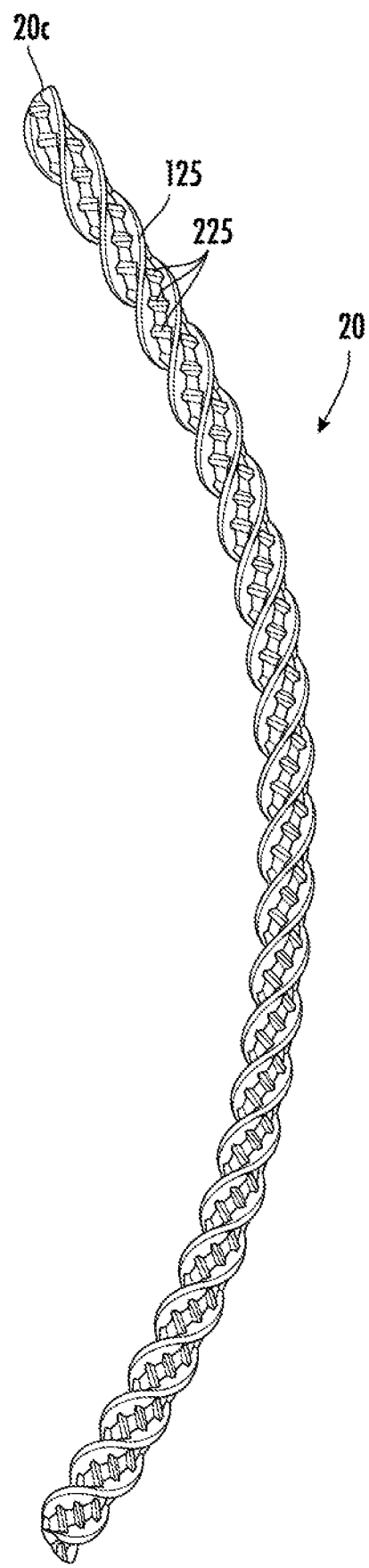

FIG. 18 illustrates an implantable pin 20 that is similar to the implantable pin 20 shown in FIG. 17, but is curved. That is, the implantable pin 20 has a radius of curvature defining a length dimension.

Figure 19:
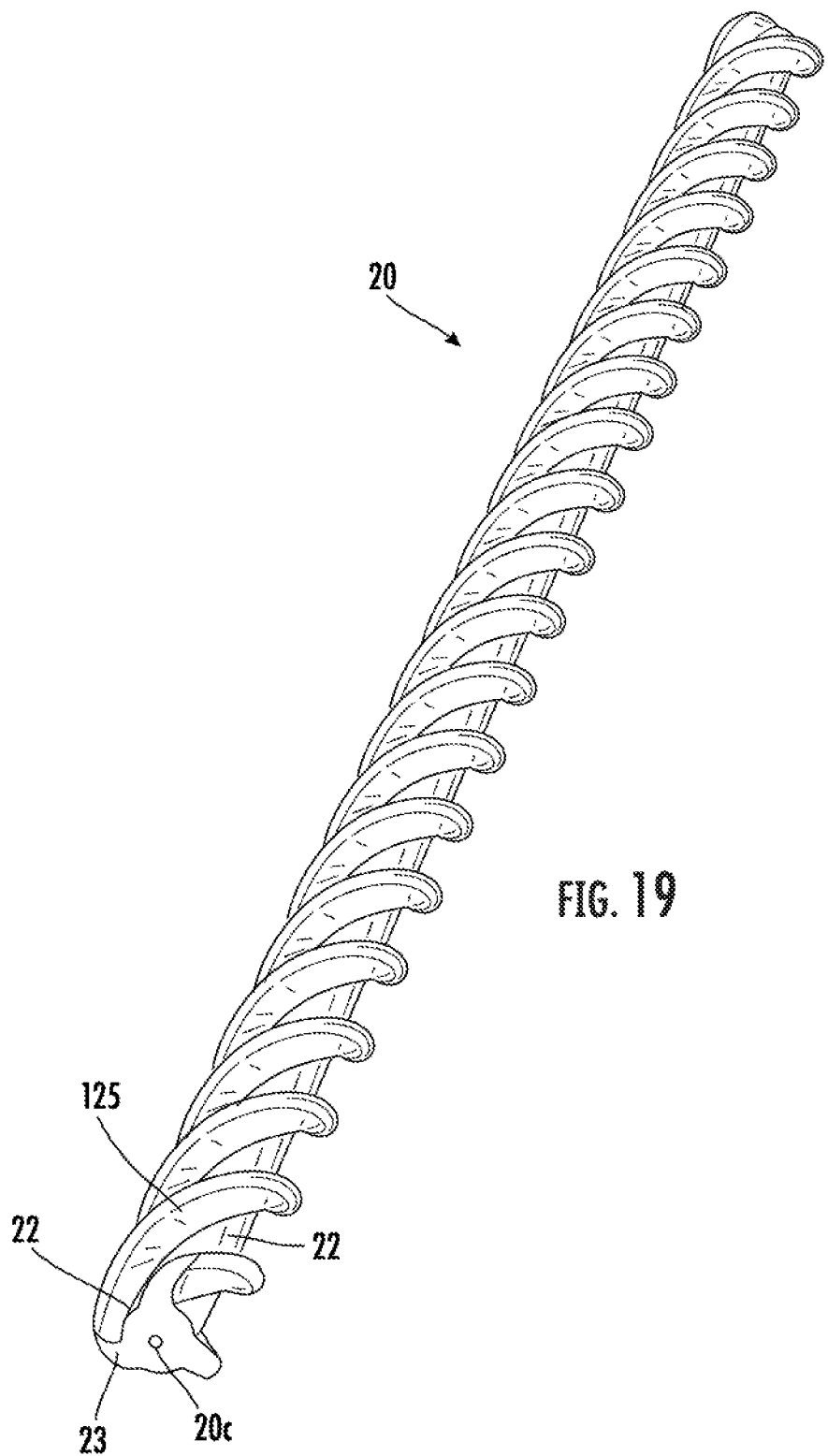
Figure 20:
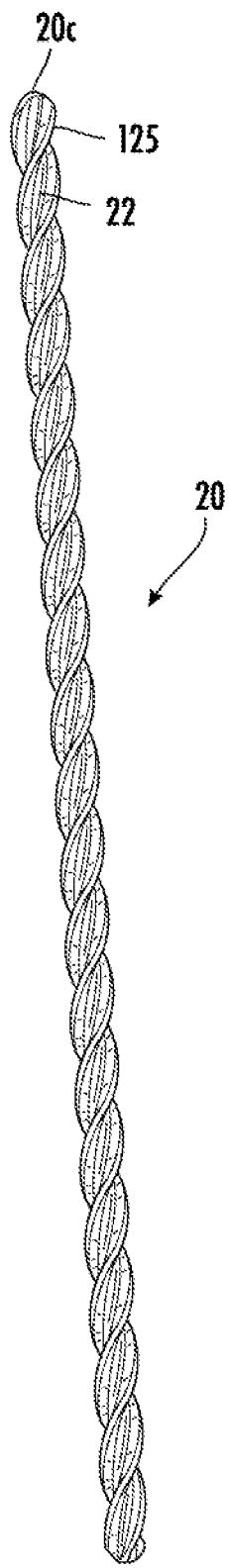

FIGS. 19 and 20 illustrate that the implantable pin 20 can have at least one major rib 125 with the valleys 22 provided as recesses between neighboring spiral segments devoid of minor ribs.

Figure 21:
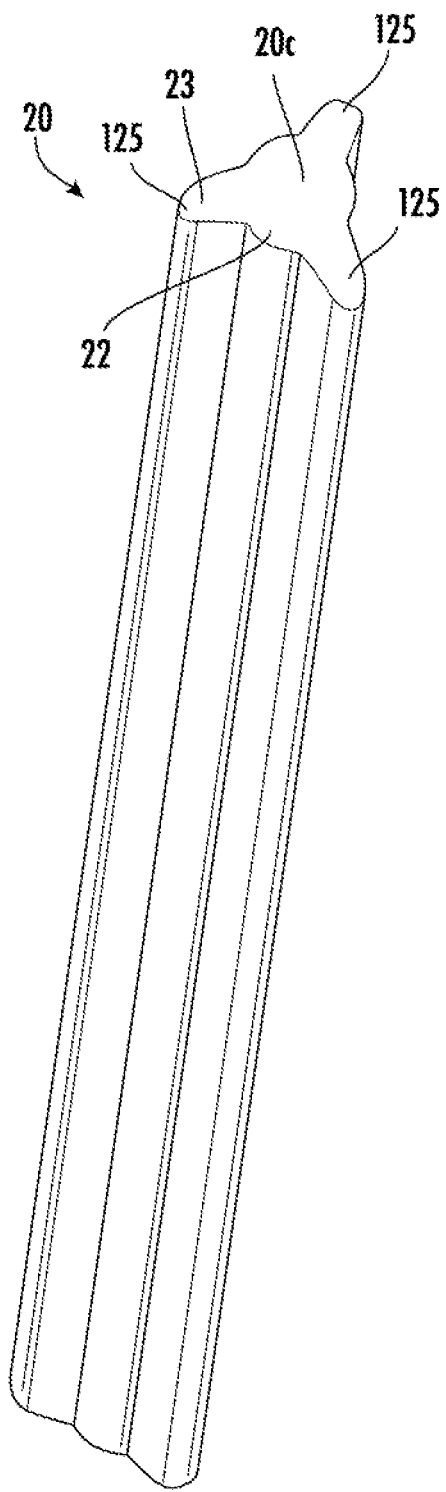

FIG. 21 illustrates an implantable pin 20 with a plurality of circumferentially spaced apart major ribs 125 that are straight ribs, separated by valleys 22.

Figure 22:
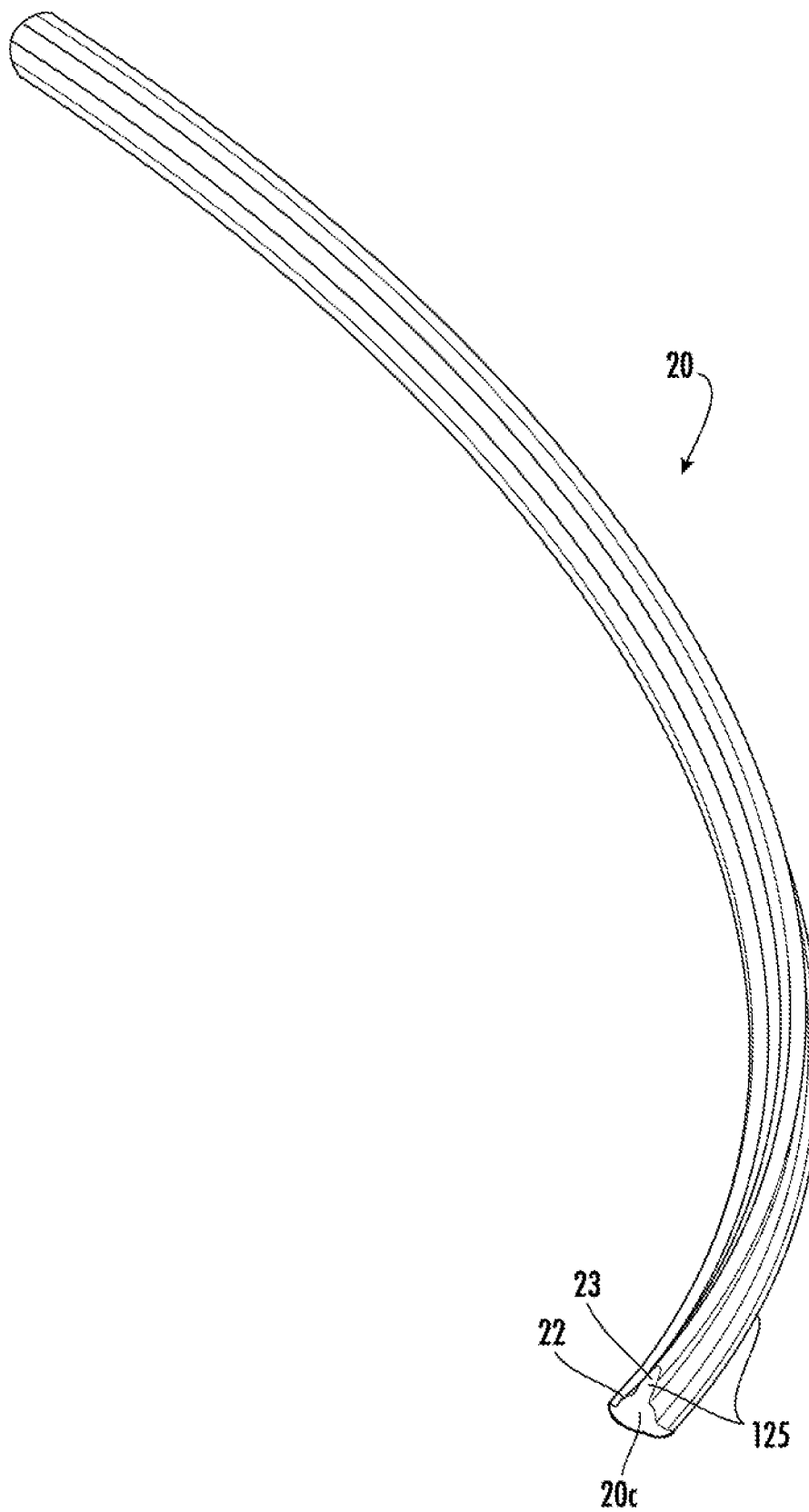

FIG. 22 illustrates an implantable pin 20 that is similar to the implantable pin 20 shown in FIG. 21, but is curved. That is, the implantable pin 20 has a radius of curvature defining a length dimension.

Figure 23:
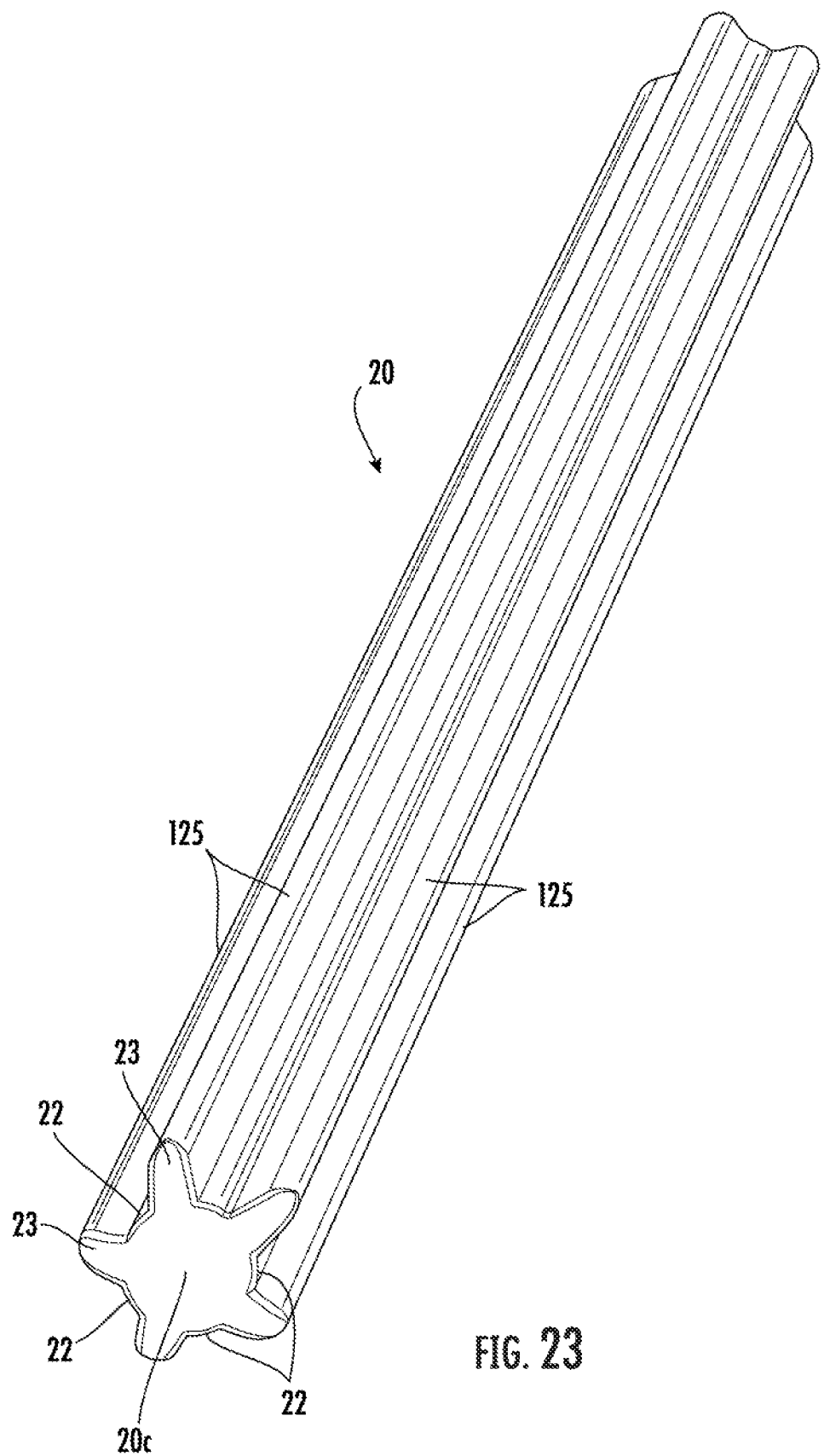

FIG. 23 illustrates an implantable pin 20 with a plurality of circumferentially spaced apart major ribs 125 that are straight ribs, shown as five ribs, each neighboring rib separated by a valley 22.

Figure 24:
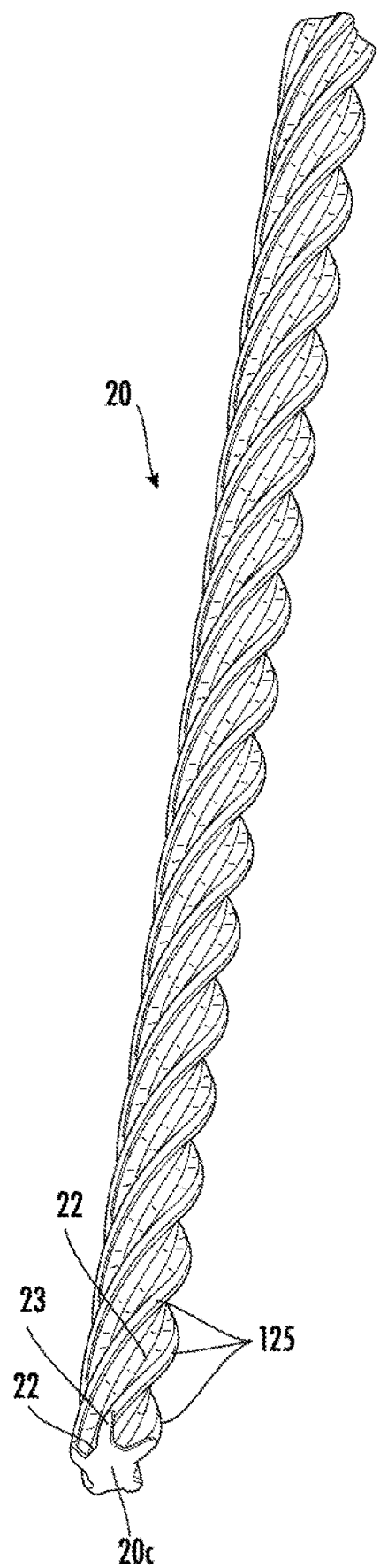

FIG. 24 illustrates an implantable pin 20 with a plurality of circumferentially spaced apart major ribs 125 that are spiral ribs, shown as five ribs, each neighboring rib separated by a valley 22.

Figure 25:
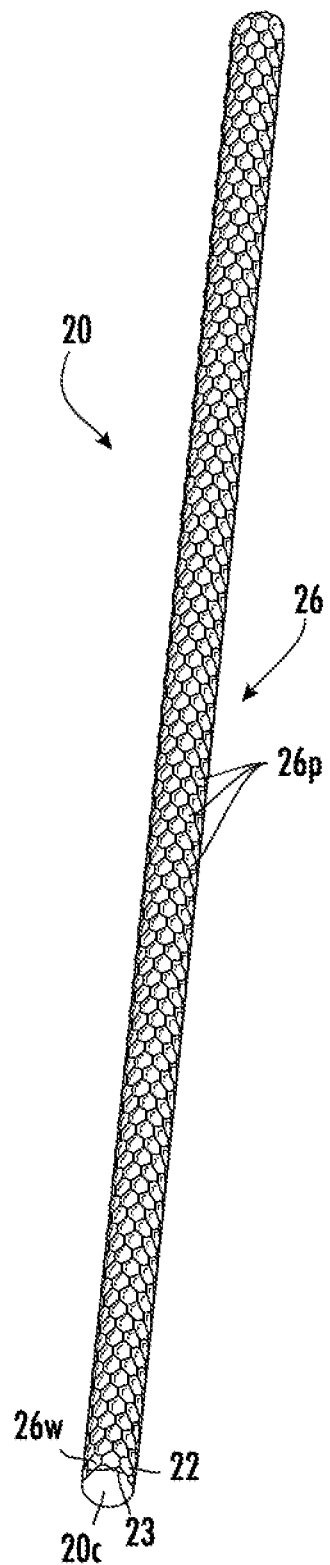

FIG. 25 illustrates another implantable pin 20 comprising an engineered patterned roughness configuration of recesses forming peaks/projectins 23 and valleys 22. That is, the valleys 22 can be provided as pockets 26p of a honeycomb pattern 26. The projections 23 can be provided as a honeycomb pocket perimeter wall 26w.

Figure 26:
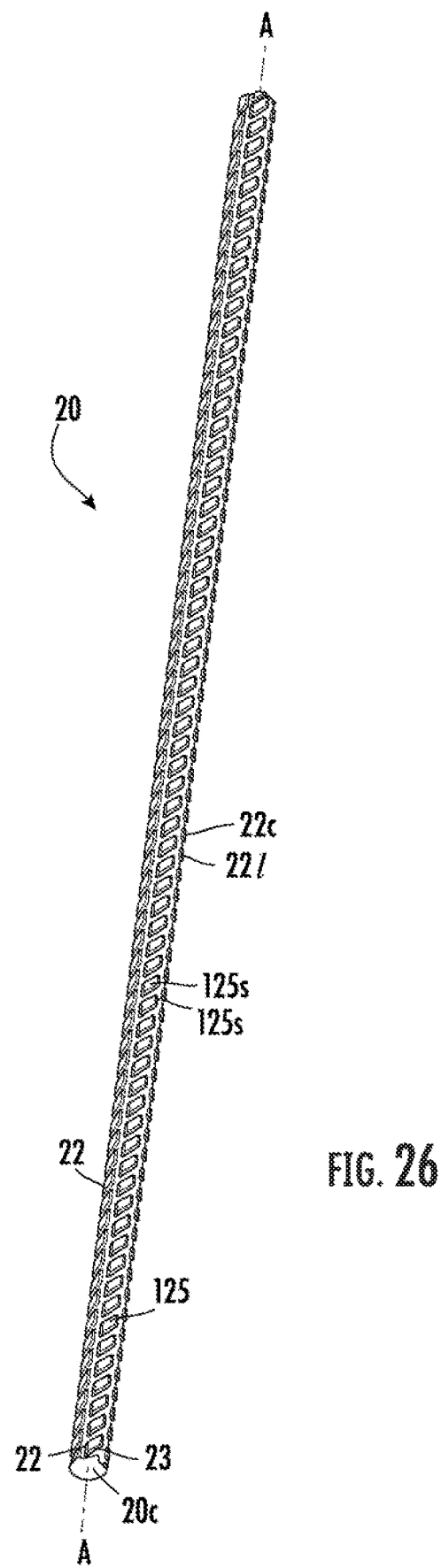
Figure 27:
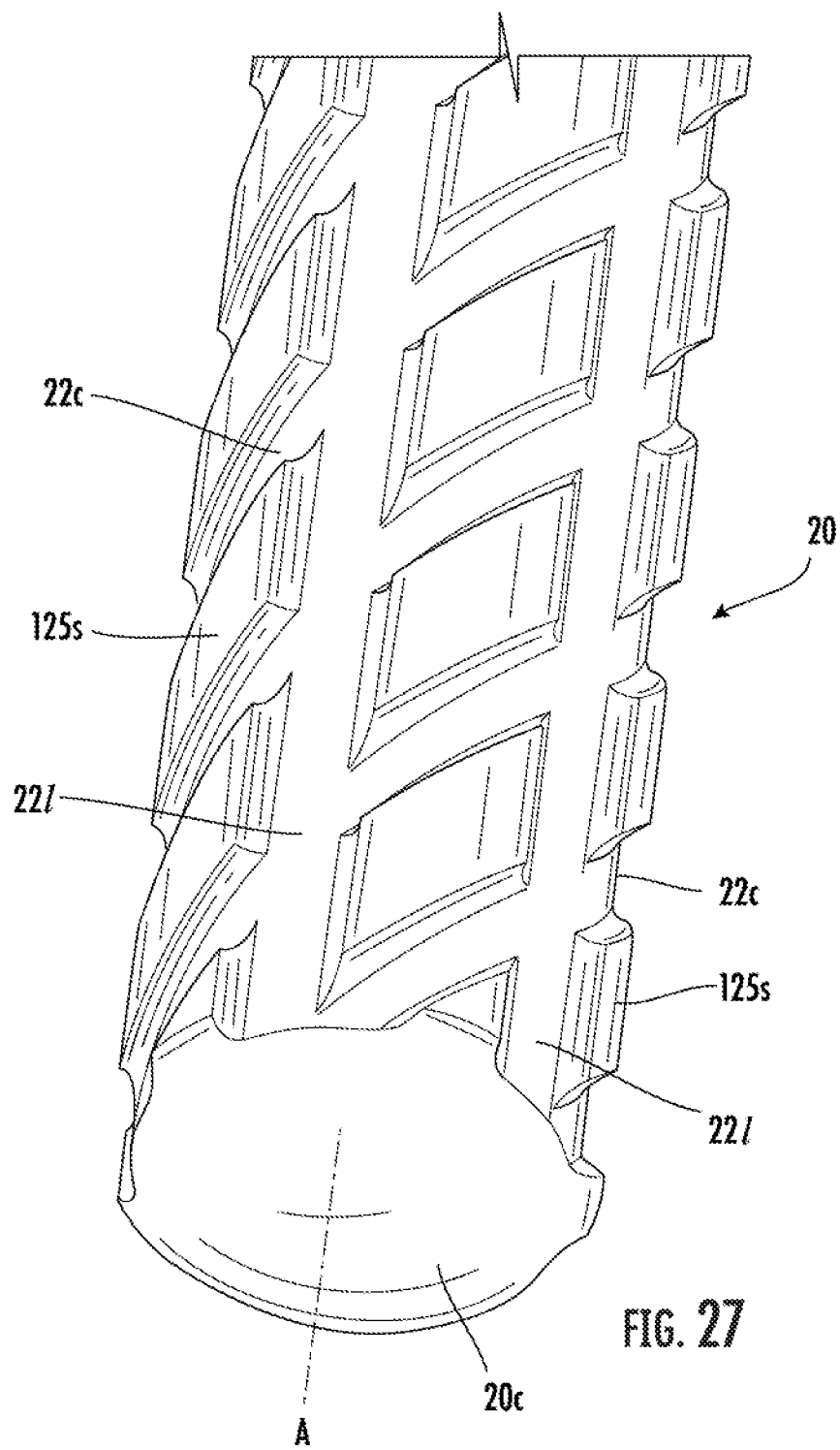

FIGS. 26 and 27 illustrate that the implantable pin 20 can include at least one rib 125 that is circumferentially discontinuous and having discrete rib segments 125s separated by neighboring valleys 22 including longitudinally extending valleys $22_1$ and circumferentially extending valleys 22c. The at least one rib 125 can be provided with the rib segments provided in a spiral pattern that project outward from the axis A-A a distance greater than the valleys 22.

Figure 29:
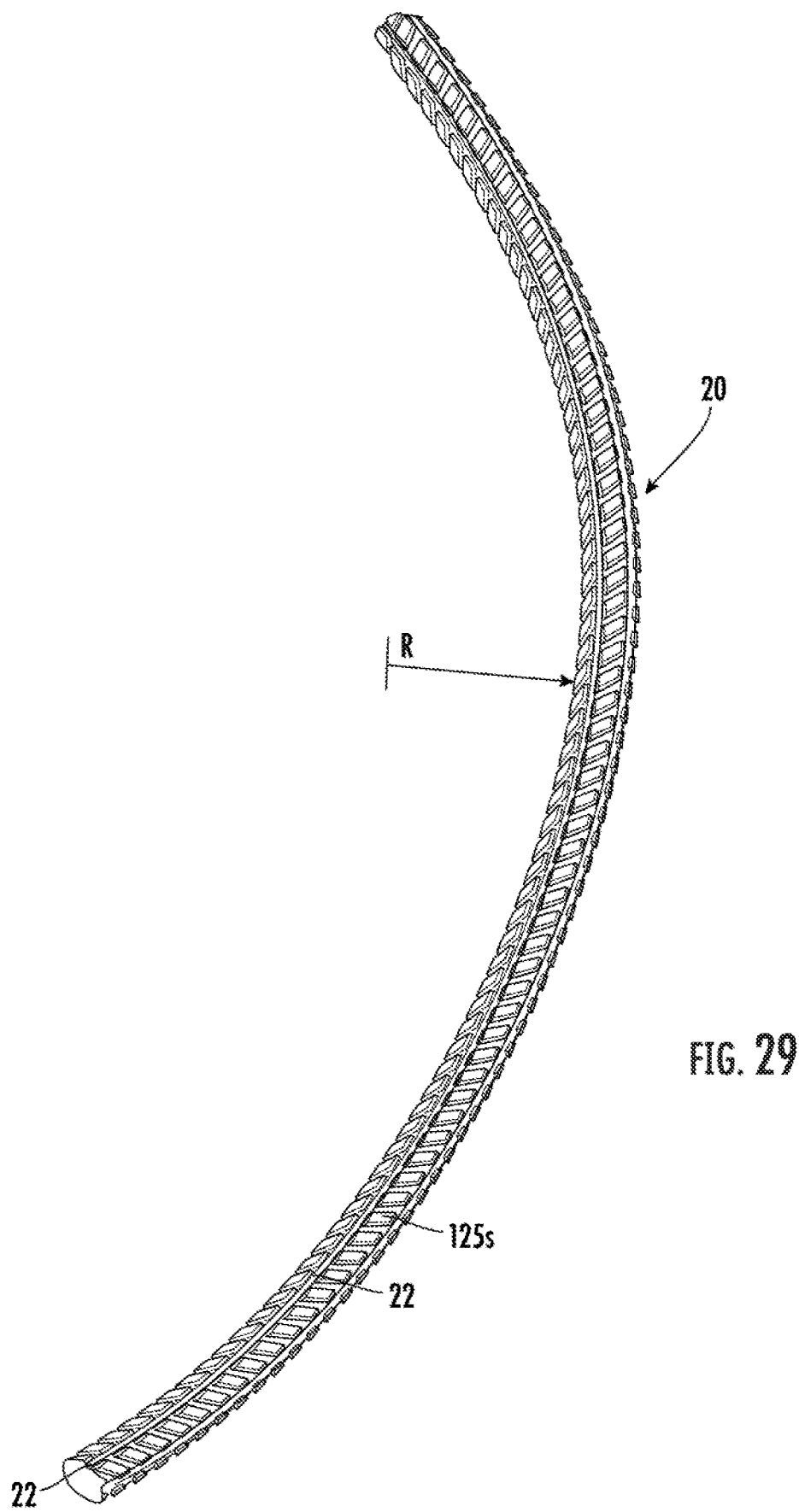
Figure 30A:
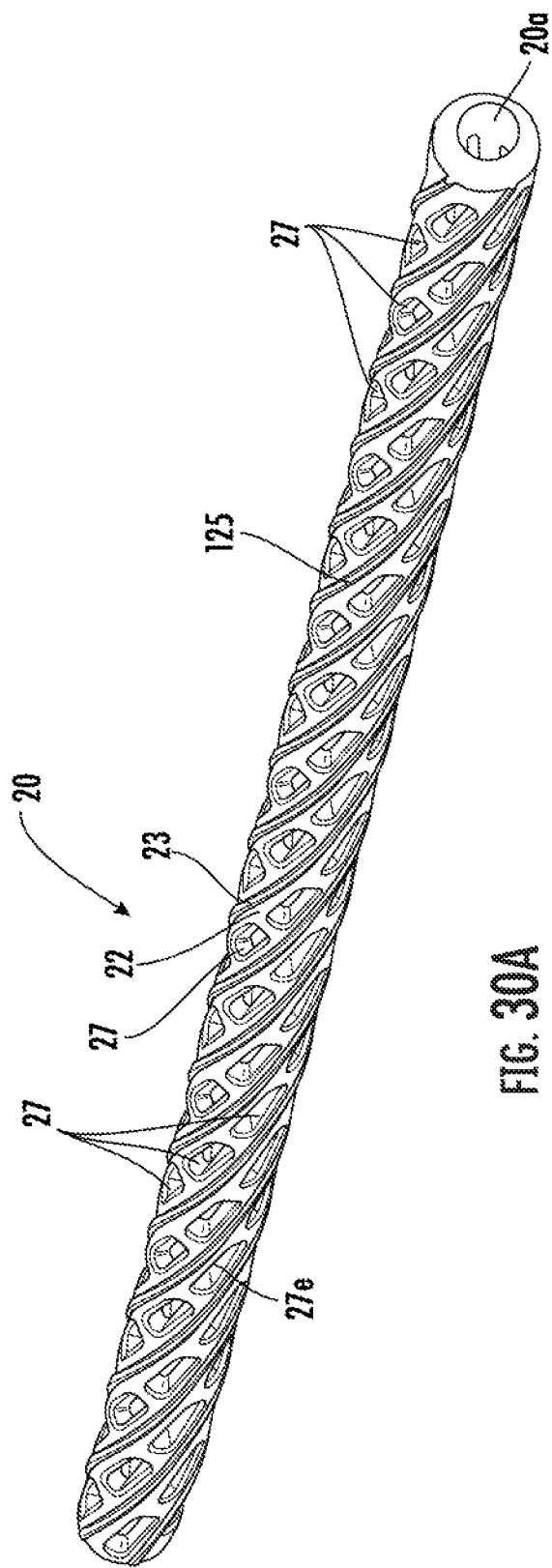
FIGS. 30A-30E are schematic illustrations of examples of implantable pins with an open internal channel in fluid communication with a plurality of fluid delivery ports according to embodiments of the present invention.
Figure 30B:
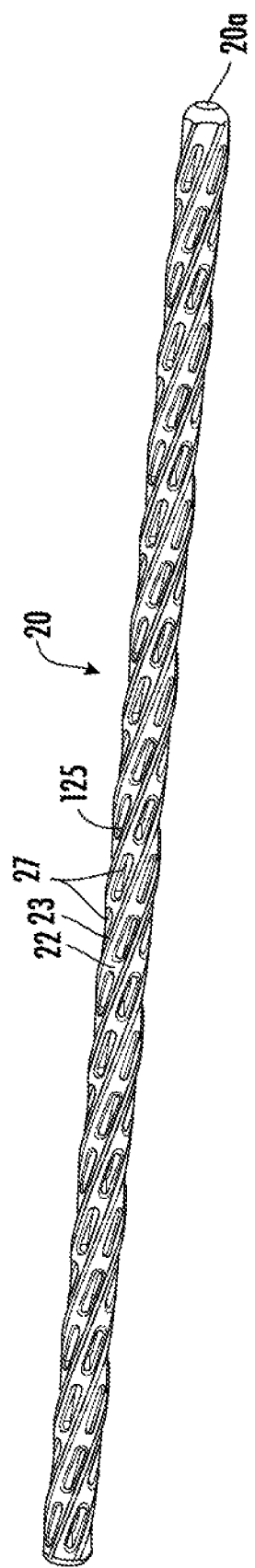
Figure 30C:
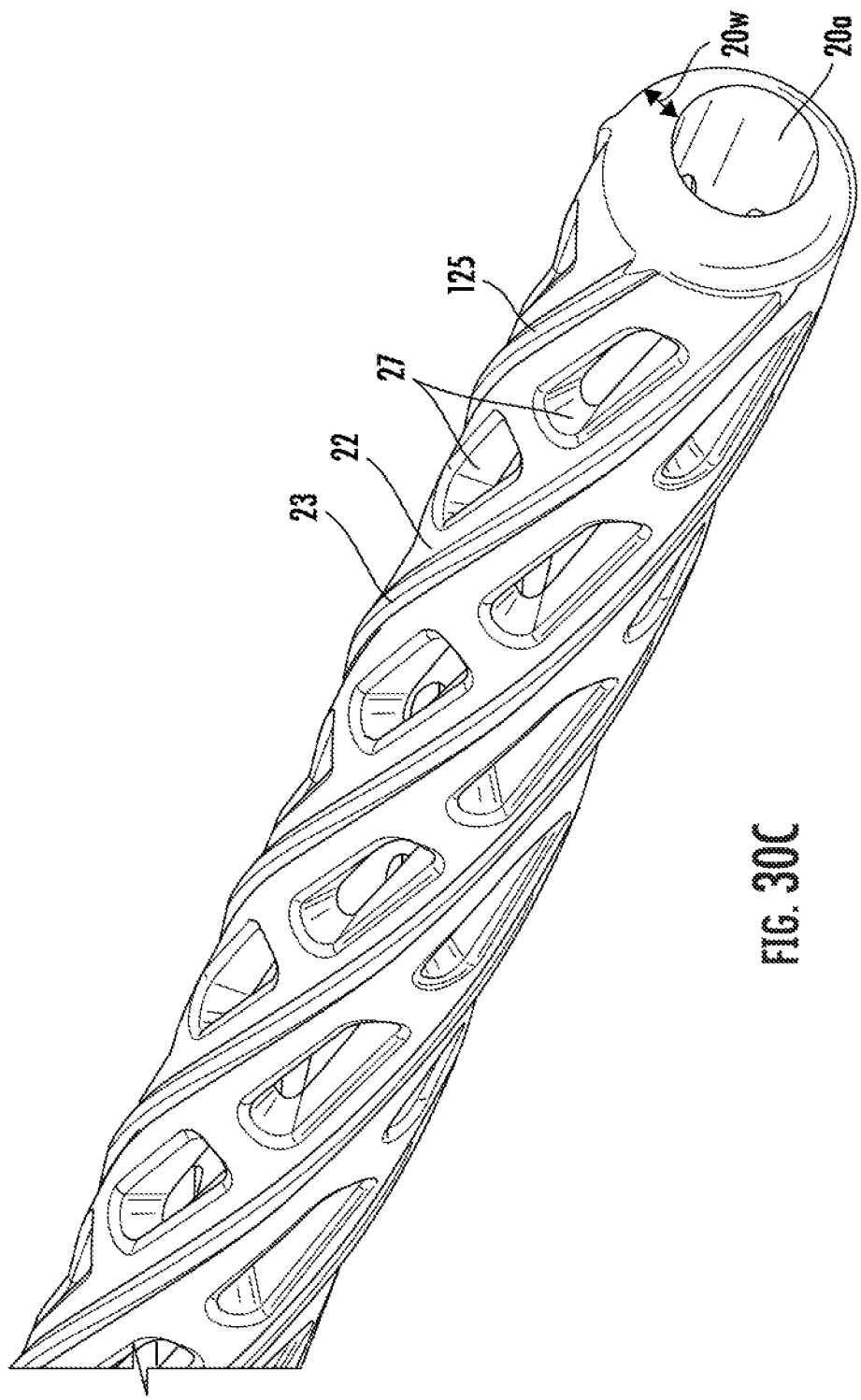
Figure 30D:
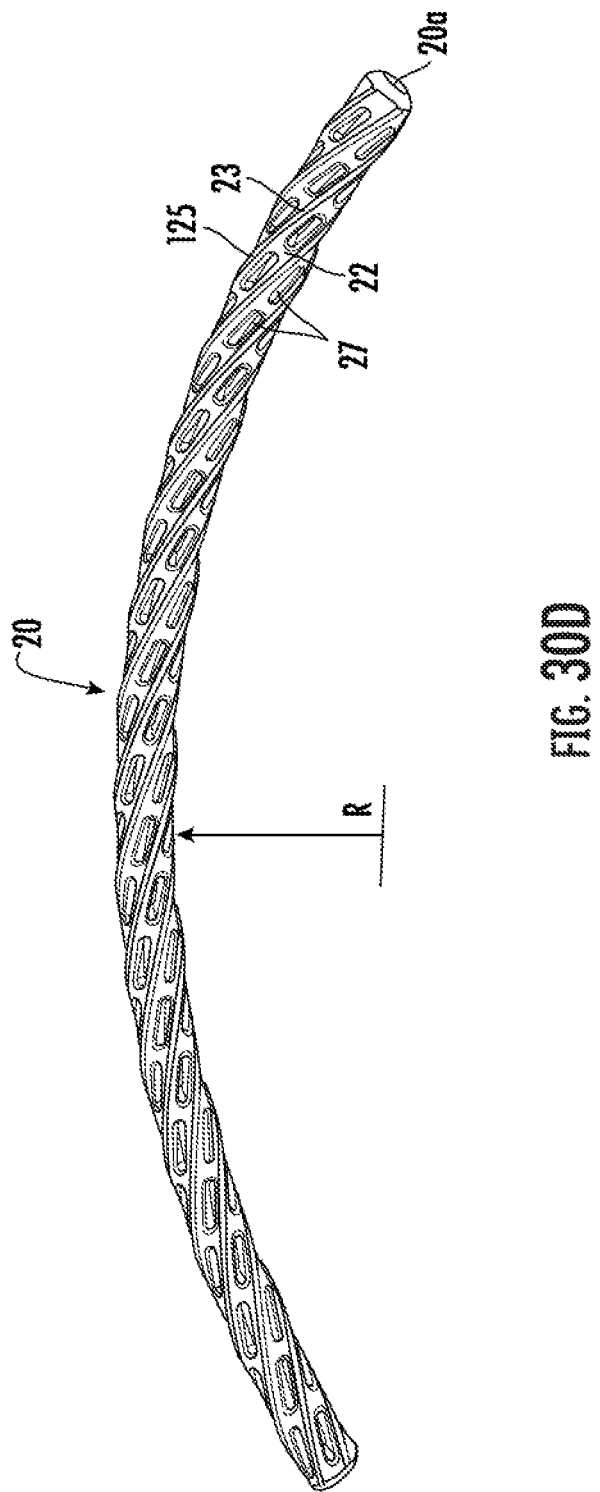
Figure 30E:
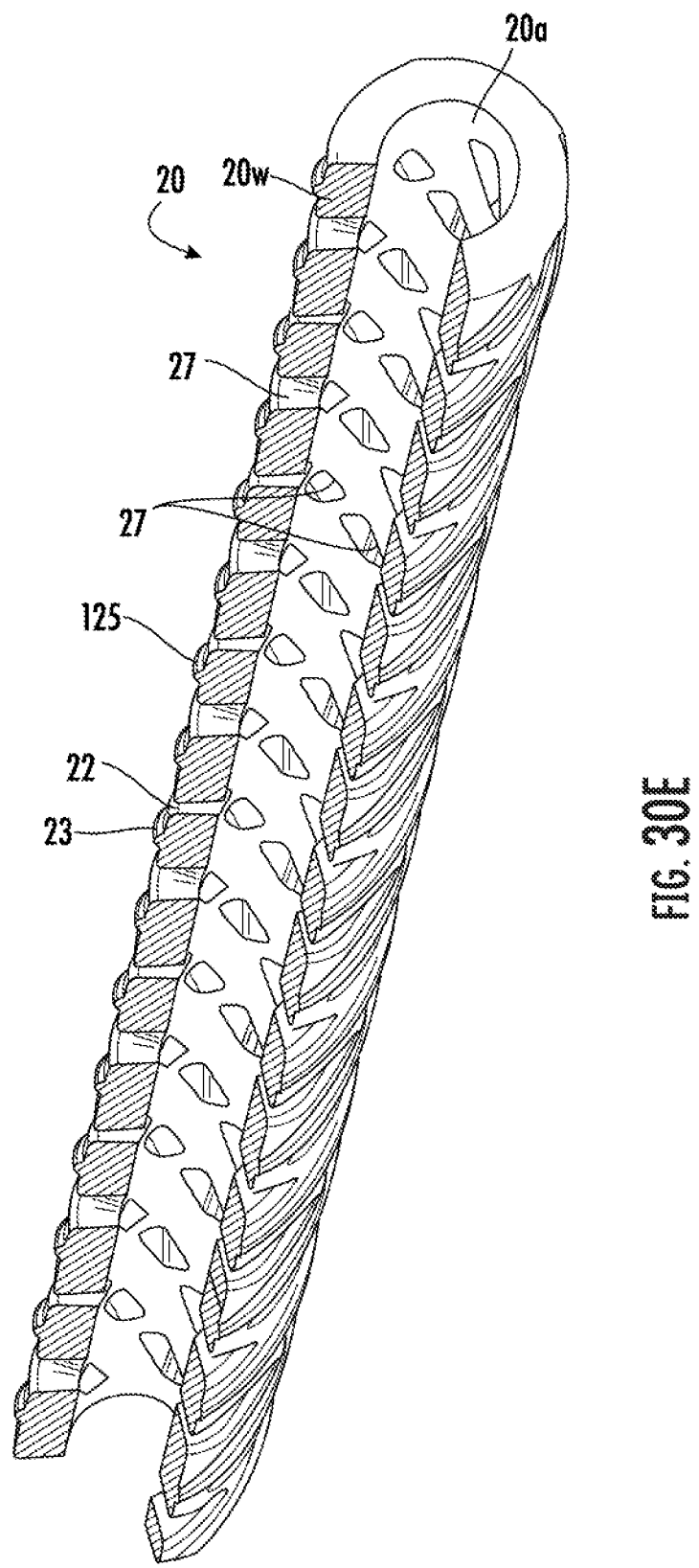

FIG. 29 illustrates an implantable pin 20 similar to that shown in FIGS. 26 and 27 but being curved with a radius of curvature defining a length dimension.

Figure 28:
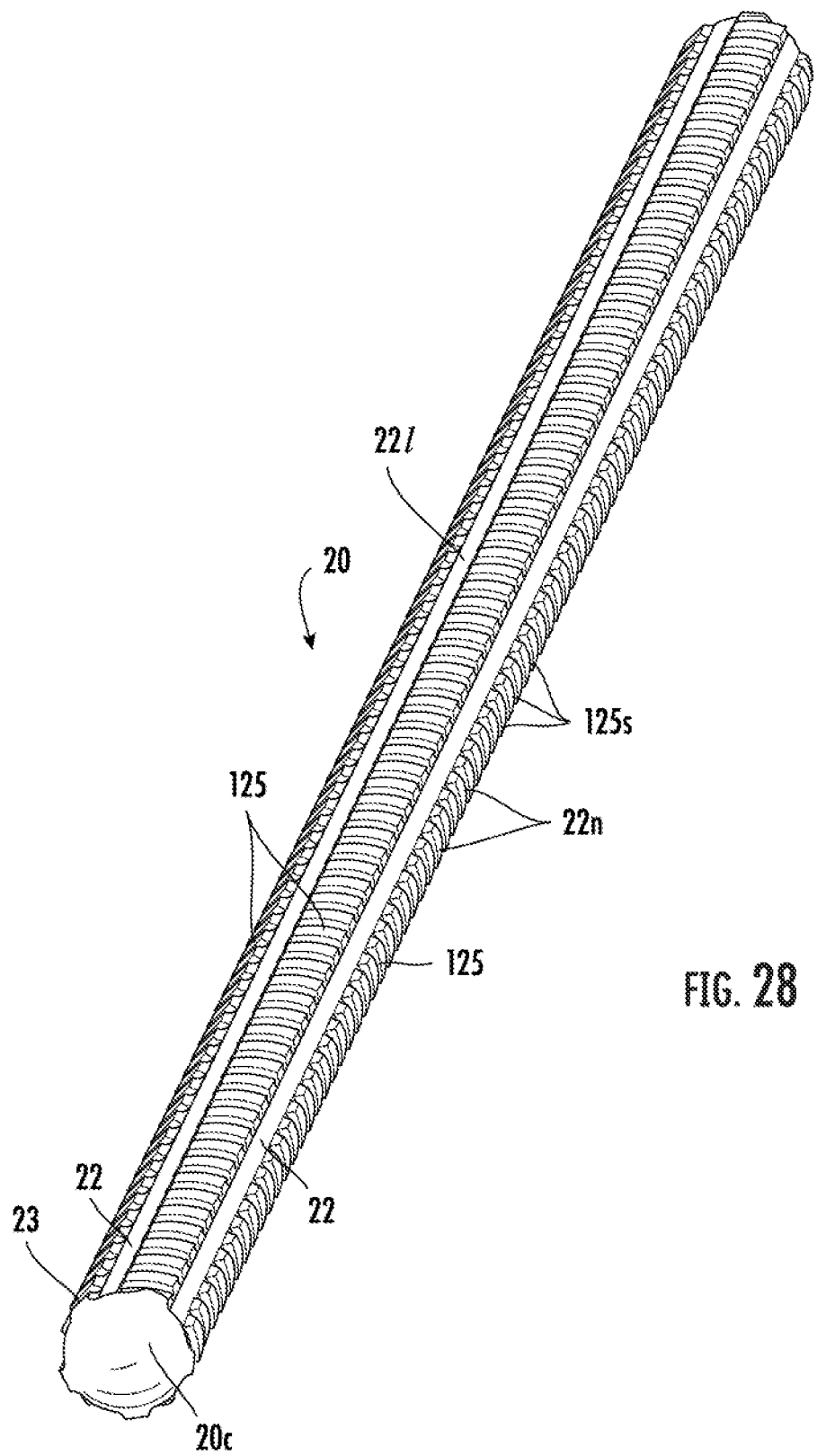

FIG. 28 illustrates an implantable pin 20 with a plurality or circumferentially spaced apart ribs 125 spaced apart by respective valleys 22. The ribs 125 can be discontinuous and provided as rib segments 125s with laterally extending and longitudinally spaced notches 22n providing valleys 22 that separate each rib segment 125s.

The implant systems 10 can provide the implantable pins 20 as free floating and in different overlying, underlying planes or different laterally extending planes. The implant systems 10 can couple two or more of the implantable pins 20 together indirectly or directly. Thus, the pins 20 can be floating but cast within the injectable material 30f solidifying and creating a solid composite structure 20, 30. When multiple pins 20 are implanted they can be routed near each other and allow for the injectable material 30f to initially form viscous liquid connection points that then solidify forming rigid connections between the composite beams formed by the implantable pins 20.

In some particular embodiments, the multiple implantable pins 20 and (bone filler composite) columns 30 can cooperate to provide an implant system 10 of curved load bearing beams that interlock to form an internal truss within the proximal femur.

Figure 31:
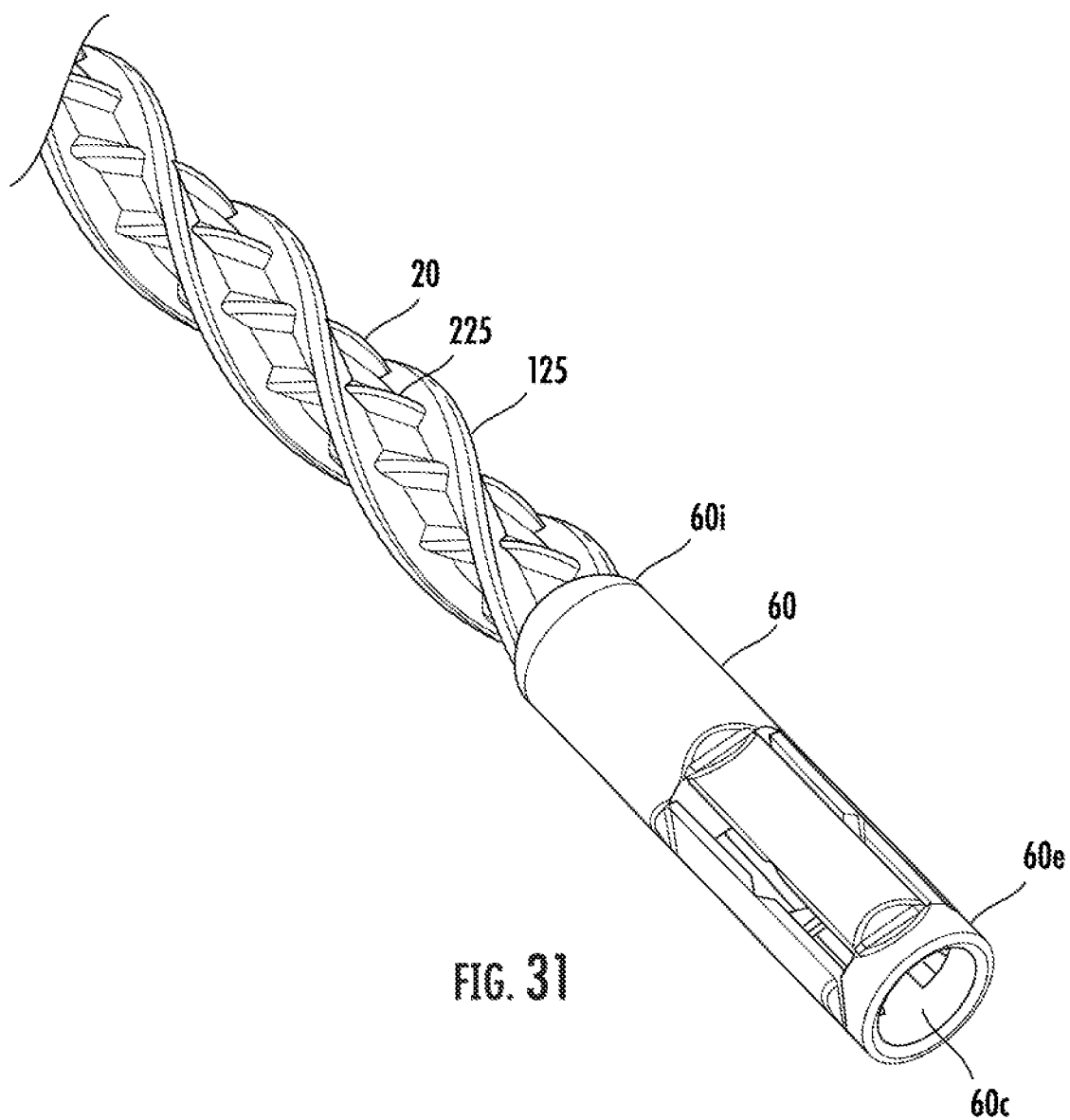
FIG. 31 is a schematic illustration of an example pin cap coupled to an implantable pin according to embodiments of the present invention.
Figure 32A:
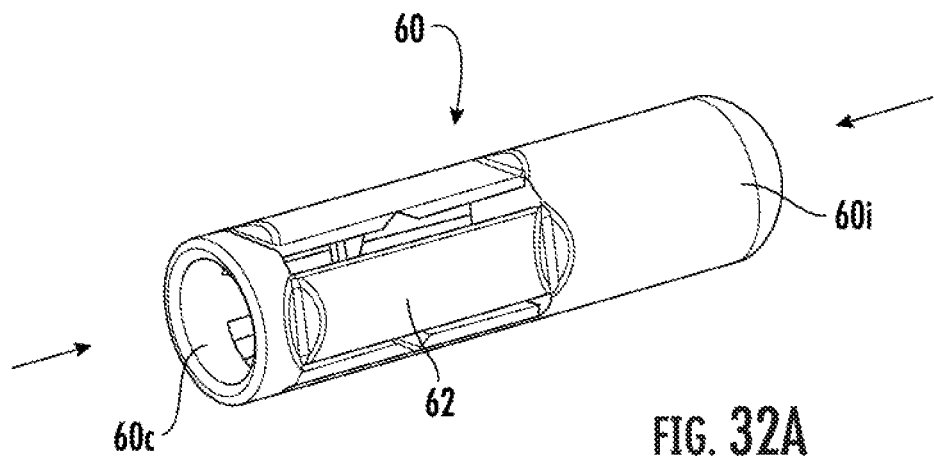
FIG. 32A is a schematic illustration of the pin cap shown in FIG. 32A.
Figure 32B:
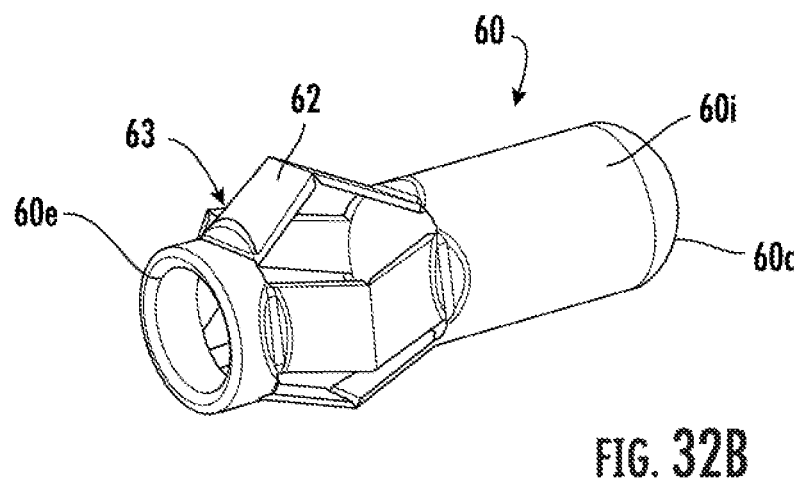
FIG. 32B is a schematic illustration of the pin cap shown in FIG. 32A, illustrating the pin cap in a compressible configuration according to embodiments of the present invention.

Referring to FIGS. 31, 32A and 32B, the pin cap 60 (which can also be referred to as a pin base) can be a separate component that can be inserted before and after a respective implantable pin 20 to help distribute loading of the pin 20 across the cortex of the femur head and/or greater trochanter. The pin cap 60 can comprise a polymer like Polyether ether ketone (PEEK). In some embodiments, the pin cap 60 can be overmolded into one or both of the two ends 20e of one or more implantable pin 20 so that they naturally deploy when exiting the needle 40.

Still referring to FIGS. 31, 32A, 32B, the pin cap 60 can have a channel 60c that slidably receives an end portion of the pin 20. The pin cap 60 can have an outer end 60e that is configured to engage the cortex of the femur head and/or greater trochanter. The pin cap 60 can have a compressible body, optionally with circumferentially spaced apart legs 63 separated by gap spaces 63. FIG. 32A illustrates a first configuration with the free outer end 60e of the pin cap 60 spaced apart a further distance from the inner end 60i than in the compressed state shown in FIG. 32B. The pin cap 60 can have the compressed state when implanted and coupled to the pin with the column of material 30. The pin cap 60 can have the extended shape during delivery, such as while held inside the needle 40 and/or stylet 50 (FIGS. 7A, 7B). Other configurations of a pin cap 60 can be used.

Embodiments of the invention can be used to treat other areas of the body that are susceptible to osteoporotic associated fractures. The pattern of injection through the delivery device can be tailored to an expected osseous trabecular structure of the bone being treated.

While the systems and devices have been described with respect to femoral surgical treatments, it is contemplated that the systems and devices may be suitable for use for other surgical procedures, particularly for other bones.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

That which is claimed:

1. A medical implant system for structurally augmenting bone or treating a fracture, comprising:
   at least one needle sized and configured to be placed into target bone;
   at least one implantable pin, a first implantable pin of the at least one implantable pin configured to be releasably held in a first needle of the at least one needle; and
   at least one delivery device comprising injectable material configured to couple to the first needle while the first implantable pin is held in the first needle whereby the at least one delivery device and the first needle cooperate to provide an external column of the injectable material about the first implantable pin.

2. The system of claim 1, wherein the at least one implantable pin has one or more of:
   (a) a solid body with a maximal cross-sectional area in a range of 1-5 mm;
   (b) a maximal outer diameter of 5 mm;
   (c) at least one spirally extending rib on an outer surface thereof;
   (d) an open longitudinally extending channel in fluid communication with a plurality of spaced apart fluid ports positioned in a spiral pattern along a length of the at least one implantable pin;
   (e) a body with an outer diameter that is in a range of about a 7 gauge-9 gauge size; or
   (f) a curved body with a radius of curvature extending over a length dimension with the curvature provided by the radius of curvature extending at least along a middle segment thereof.

3. The system of claim 1, further comprising a stylet sized and configured to slidably and releasably couple to the at least one needle with the stylet surrounding at least part of the needle, wherein the stylet is configured with rigidity sufficient to form a bone channel in cancellous bone to thereby place the at least one needle into the target bone directly using the stylet without reaming a bone channel with a drill.

4. The system of claim 1, wherein the injectable material is configured to solidify in vivo to define a solid external column of material that is coupled to and extends over at least a major portion of a length of the first implantable pin as the external column of the injectable material about the first implantable pin.

5. The system of claim 1, wherein the first needle is curvilinear, and wherein the first implantable pin is configured so that when implanted it has a radius of curvature over a length dimension including at least a middle segment thereof that defines a curved elongate body.

6. The system of claim 1, further comprising a second implantable pin configured to serially releasably couple to the first needle of the at least one needle in place of the first implantable pin or couple to a second needle of the at least one needle to be releasably held in the first needle or the second needle and with the first needle or the second needle coupled to the at least one delivery device comprising injectable material whereby the at least one delivery device and the first needle or the second needle cooperate therewith to provide an external column of the injectable material about the second implantable pin, and wherein the external column of injectable material of the first implantable pin is configured to solidify in vivo to define a solidified external column of material about the first implantable pin and the external column of injectable material of the second implantable pin is configured to solidify in vivo to define a solidified external column of material about the second implantable pin.

7. The system of claim 6, wherein, in position, the first implantable pin with the solidified external column of material has opposing first and second end portions and is configured to curve outward in a direction toward a proximal end of a femur as the target bone and, wherein the second implantable pin with the solidified external column of material has opposing first and second end portions and curves outward in a direction opposite the first implantable pin.

8. The system of claim 7, wherein, the first end portion of the first implantable pin is coupled to the first end portion of the second implantable pin and the second end portion of the first implantable pin is coupled to the second end portion of the second implantable pin whereby the first implantable pin with the external column of injectable material and the second implantable pin with the external column of injectable material are interlocked and configured to provide load bearing beams adapted to form an internal truss within the target bone.

9. The system of claim 1, further comprising a second implantable pin configured to serially releasably couple to the first needle of the at least one needle in place of the first implantable pin or couple to a second needle of the at least one needle to cooperate with the at least one delivery device comprising injectable material to provide an external column of the injectable material about the second implantable pin, wherein the first implantable pin with the external column of injectable material and the second implantable pin with the external column of injectable material are configured to laterally extend over an entire lateral extent or substantially the entire lateral extent of a proximal end portion of a femur as the target bone between a femoral head and greater trochanter to thereby define load bearing beams that are adapted to form an internal truss within the proximal end portion of the femur.

10. The system of claim 9, further comprising a third implantable pin with an external column of injectable material, wherein the third implantable pin is configured to extend in a different plane and across a medial segment of one or both of the first implantable pin with the external column of injectable material and the second implantable pin with the external column of injectable material and is adapted to be positioned from a location under a lesser trochanter to a location proximate the proximal end of the femur between a femoral head and greater trochanter.

11. The system of claim 1, wherein the needle is cylindrical with an open longitudinally extending channel and a wall surrounding the open channel with the open channel sized to receive the first implantable pin.

12. The system of claim 11, wherein the needle comprises at least one fluid delivery port extending through the wall.

13. The system of claim 1, wherein the at least one implantable pin is configured to have a straight linear shape outside the first needle when not exposed to compressive forces and is configured to have a curvilinear shape when in the first needle and when implanted with a curvature of the curvilinear shape extending along at least a middle segment thereof.

14. The system of claim 1, wherein the first implantable pin has a maximal lateral extent in a range of about 1 mm to about 4 mm and has a longitudinally extending center axis and, is configured so that, at least when implanted, it also has a radius of curvature that corresponds to a curvature of a trabecular bone load path of a normal trabecular bone as the target bone.

15. The system of claim 1, wherein the first implantable pin has a solid body and comprises at least one rib that extends over at least a major portion of a length thereof, and wherein a lateral cross-sectional shape of the first implantable pin has a perimeter with a plurality of valleys and projections.

16. The system of claim 15, wherein the at least one rib comprises at least one spirally extending rib.

17. The system of claim 15, wherein the at least one rib comprises at least one longitudinally extending straight rib.

18. The system of claim 1, wherein the at least one implantable pin comprises at least one major rib and a plurality of minor ribs that extend radially and/or circumferentially outward from a longitudinally extending center axis, and wherein the plurality of minor ribs extend outward from the center axis a lesser distance than the at least one major rib and have a lesser thickness than the at least one major rib.

19. The system of claim 18, wherein the plurality of minor ribs comprise rib segments that are angularly offset from and extend between adjacent segments of the at least one major rib, and wherein the at least one major and the plurality of minor ribs cooperate to provide resistance to bending while allowing the injectable material to pass about outer surfaces of a respective implantable pin.

20. The system of claim 1, wherein the at least one implantable pin is formed from a material comprising titanium, cobalt chromium, stainless steel, magnesium, carbon fiber, or PEEK or combinations or derivatives thereof, and wherein the at least one implantable pin has a maximal outer diameter of 5 mm with at least one spirally extending rib on an outer surface thereof.

21. The system of claim 20, wherein the at least one implantable pin comprises a plurality of spaced apart fluid ports positioned in a spiral pattern along a length of the at least one implantable pin.

22. The system of claim 1, wherein the injectable material comprises a non-cytotoxic and/or biocompatible bone filler.

23. The system of claim 1, further comprising at least one pin cap, wherein the at least one pin cap is configured to provide a landing for an end of the at least one implantable pin against a cortex of a femur as the target bone.

24. The system of claim 23, wherein the at least one pin cap comprises an expandable PEEK plug.

25. A method of treating a fracture and/or structurally reinforcing target bone, comprising:
placing a needle in target bone;
inserting an implantable pin into the needle prior to, during, or after the needle is placed in the target bone;
flowably delivering a biocompatible and/or non-cytotoxic material into the needle and about the implantable pin while the implantable pin is held in the needle to provide an external column of the biocompatible and/or non-cytotoxic material about the implantable pin; and
withdrawing the needle from the target bone during the flowably delivering while leaving the implantable pin in position in a bone channel thereby implanting the implantable pin in the target bone with the external column of biocompatible and/or non-cytotoxic material coupled to the implantable pin and adjacent bone.

26. The method of claim 25, wherein the placing the needle comprises coupling the needle to a stylet and inserting the stylet and the needle together into cancellous bone of the target bone to directly form the bone channel without reaming the cancellous bone with a drill, then withdrawing the stylet leaving the needle in position in the target bone.

27. The method of claim 25, further comprising repeating the placing, inserting, flowably delivering and withdrawing steps a plurality of times to implant a plurality of different implantable pins, wherein, when solidified, the column of material comprises a matrix of cancellous tissue interspersed with the column of material.

28. The method of claim 27, further comprising structurally coupling a plurality of the different implantable pins together to form an internal truss.

29. The method of claim 27, wherein the different implantable pins are not attached and are spaced apart in the target bone.

30. The method of claim 27, wherein, when implanted, first and second implantable pins provided by the different implantable pins laterally extend over an entire lateral extent or substantially the entire lateral extent of a proximal end of a femur as the target bone, between a femoral head and greater trochanter to thereby define load bearing beams that form an internal truss within the proximal end of the femur.

31. The method of claim 27, wherein the different implantable pins include a first implantable pin and a second implantable pin, wherein the placing and inserting steps are carried out to place the first implantable pin to curve outward in a direction toward a proximal end of a femur and to then place the second implantable pin to curve outward in a direction opposite the first implantable pin, the method further comprising coupling a first end portion of the first implantable pin to a first end portion of the second implantable pin and coupling a second end portion of the first implantable pin to a second end portion of the second implantable pin whereby the first and second implantable pins are interlocked to provide load bearing beams to form an internal truss within the target bone.

32. The method of claim 31, wherein the different implantable pins include a third implantable pin, and wherein the third implantable pin extends in a different plane and across a medial segment of one or both of the first and second implantable pins from a location under a lesser trochanter to a location proximate the proximal end of the femur between a femoral head and greater trochanter.

33. The method of claim 27, wherein the implantable pins have a solid core.

34. The method of claim 27, wherein the implantable pins have a cross-sectional shape having a perimeter defined by a plurality of valleys and projections with a maximal lateral extent in a range of about 1 mm to about 5 mm, wherein at least some of the implantable pins, when implanted, have segments that couple to each other and/or that overlap with each other in different planes, and wherein, when implanted, each of the implantable pins are coupled to and surrounded by respective solid columns.

35. The method of claim 25, further comprising placing a cap on a leading end of the implantable pin and against a cortical bone before the flowably delivering step.

36. The method of claim 25, further comprising cutting an end portion of the implantable pin for customized sizing prior to, during or after withdrawing the needle.

37. The method of claim 25, wherein the flowably delivering comprises flowing the biocompatible and/or non-cytotoxic material longitudinally along a length of the needle and also flowing the biocompatible and/or non-cytotoxic material out of at least one flow port in the needle, in a direction toward cancellous bone.

* * * * *